US00H002057H

(19) United States

(12) Statutory Invention Registration (10) Reg. No.: US H2057 H

Veers et al. (43) Published: Jan. 7, 2003

(54) LOAD ATTENUATING PASSIVELY ADAPTIVE WIND TURBINE BLADE

(75) Inventors: Paul S. Veers, Albuquerque, NM (US); Donald W. Lobitz, Albuquerque, NM (US)

(73) Assignee: Sandia Corporation, Albuquerque, NM (US)

(21) Appl. No.: 09/758,166

(22) Filed: Jan. 10, 2001

(51) Int. Cl.[7] ..... F03D 11/00

(52) U.S. Cl. ..... 416/230; 416/240

(58) Field of Search ..... 416/132 B, 230, 416/240, 241 A

(56) References Cited

U.S. PATENT DOCUMENTS 4,037,988 A * 7/1977 Laird ..... 416/141

5,269,657 A * 12/1993 Garfinkle ..... 416/226

OTHER PUBLICATIONS

Cheney, M.C., et al., "Self–Regulating composite Bearingless Wind Turbine," *Solar Energy*, vol. 20, pp 233–240 (1978).

Bottrell, G.W., "Passive Cyclic Pitch Control for Horizontal Axis Wind Turbines," *NASA Conf. Pub. 2185,*DOE Pub CONF–810226, Cleveland, Ohio pp 271–275 (1981).

Currin, H., "North Wind 4kW 'Passive' Control System Design," *Proc. Wind Turbine Dynamics*, NASA PUB2185, DOE Pub. CONF–810226, Cleveland, Ohio pp 265–270 (1981).

Eggers, JR., A.J., et al., "Effects of Blade Bending on Aerodynamic control of Fluctuating Loads on Teetered HAWT Rotors," *J. Solar Energy Eng.,* vol. 118, No. 4, pp 239–245 (Nov. 1996).

Feuchtwang, J.B., et al., "Aerofoil Profile Selection for Passive Pitch control Using Self–Twisting Blades," *Proc. 17th BWEA Wind Engergy Conf.,* Editor J. Halliday, BWEA, Warwick, UK, pp 237–242 (Jul. 19–21, 1995).

deGoeij, W.C., et al., "Implementation of Bending–Torsion Coupling in the Design of a Wind–Turbine Rotor Blade," *Applied Energy*, vol. 63, pp 191–207 (1999).

Hohenemser, K.H., et al., "Dynamics of an Experimental Two Bladed Horizontal Axis Wind Turbine with Blade Cyclic Pitch Variation," *Wind Turbine Dynamics*, NASA PUB 2185, DOE Pub. CONF–810226, Cleveland, Ohio, pp 277–286 1981).

Infield, D.G., et al., "Development and Testing of a Novel Self–twisting Wind Turbine Rotor," *1999 European Wind Energy Conf.,* Nice France, pp 329–332 (Mar. 1–5 1999).

(List continued on next page.)

*Primary Examiner*—Harold J. Tudor

(74) *Attorney, Agent, or Firm*—Rod D. Baker; Russell D. Elliott

(57) ABSTRACT

A method and apparatus for improving wind turbine performance by alleviating loads and controlling the rotor. The invention employs the use of a passively adaptive blade that senses the wind velocity or rotational speed, and accordingly modifies its aerodynamic configuration. The invention exploits the load mitigation prospects of a blade that twists toward feather as it bends. The invention includes passively adaptive wind turbine rotors or blades with currently preferred power control features. The apparatus is a composite fiber horizontal axis wind-turbine blade, in which a substantial majority of fibers in the blade skin are inclined at angles of between 15 and 30 degrees to the axis of the blade, to produces passive adaptive aeroelastic tailoring (bend-twist coupling) to alleviate loading without unduly jeopardizing performance.

10 Claims, 15 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ADAMS/NASTRAN comparison for the CEB with bending-twist coupling

OTHER PUBLICATIONS

Infield, D.G., et al., "Design Criteria for Passive Pitch Control of Wind Turbines Using Self–Twisting Blades," *Intl J. of Ambient Energy*, vol. 16, No. 3, pp13–146 * Jul. 1995).

Joosse, P. a., et al., "Development of a Tentortube for Blade tip Mechanisms," *Proc 196 European Union Wind Energy Conf and Exhibition*, Goteborg, May 20–24, 1996.

van den Berg, R.M., et al., "Passive Power Control by Self Twisting Blades," *Proc. of 1994 European Wing Energy Assn Conf and Exhibition, Thessaloniki*, Oct. 10–14, 1994.

Kelley, N.D., "Full Vector (3–D) Inflow Simulation in Natural and Wind Farm Environments Using an Expanded Version of the SNLWING (Veers) Turbulence Code" *Proceedings of the 12th ASME Wind Energy Symposium, Houston*, 1993.

Klimas, P.C., "Tailored Airfoils for Vertical Axis Wind Turbines," *Sandia Report SAND84–1062 UC–60,* pp 1–12 (Feb. 1992).

Kooijman, H.J.T., "Bending–Torsion Coupling of a Wind Turbine Rotor Blade," *Netherlands Energy Research Foundation ECN,* ECN–1–96–060, pp 1–79 with Appendices (Dec. 1996).

Karaolis, N.M., et al., "Active and Passive Aerodynamic Power Control Using Asymmetric Fibre Reinforced Laminates for Wind Turbine Blades," *Wind Energy Conversion1988, Proc. of 10th British Wind Energy Assn Conf.,* pp 163–172 (Mar. 24 1988).

Karaolis, N.M., et al., "Composite Wind Turbine Blades: Coupling Effects and Rotor Aerodynamic Performance," EWEC 1989, *European Wind Energy Conf.,* pp 244–248 (1989).

Lobitz, D.W., et al., "Performance of Twist–Coupled Blades on Variable Speed Rotors," AIAA–0062, *American Inst. of Aeronautics and Astronautics*, pp 1–9 (2000).

Lobitz, D.W., et al., "Aeroelastic Behavior of Twist coupled HAWT Blades", AIAA–, 0029, *American Inst. of Aeronautics and Astronautics*, ASME Wind Energy Symposium held at 36th AIAA Aerospace Sciences Meeting and Exhibition, Reno, NV, Jan. 12–15, 1998 pp 1–11.

Lobitz, D.W., et al., "Load Mitigation with Twist–Coupled HAWT Blades," AIAA–0033 American Inst. of Aeronautics and Astronautics, *Proc. 1999 ASME Wind Energy Symposium held at 37th AIAA Aerospace Sciences Meeting and Exhibition, Reno, NV,* (Jan. 11–14, 1999) p 1–11.

Manuel, L., et al., "Moment–Based Probability Modelling and Extreme Response Estimation the FITS Routine, Version 1.2," *Sandia Report, SAND99–2985,* Albuquerque, New Mexico (Nov. 1999), pp 1–35.

Middleton, V., et al., "Passive Blade Pitching for Overspeed Control of an HAWT," *Wind Energy 1998, Proc of 20th British Wind Energy Assn Conf.,* Cardiff Univ of Wales, pp 103–117 (Sep. 2–4 198).

Ong, C–H, et al., "Design, Manufacture and Testing of a Bend–Twist D–Spar," *Proc 1999 ASME Wind Energy Symposium*, Reno NV pp 1–106 (Jan. 11–14, 1999).

Ong, C–H, et al., "The Use of Carbon Fibers in Wind Turbine Blade Design—a SERI–8 Blade Example," *Sandia National Laboratories*, SAND2000–0478 (Mar. 2000), pp 1–69.

Ong C–H, et al., "Elastic Tailoring of a Composite D–Spar" *Sandia National Laboratories*, SAND98–1750 pp 1–27 (Aug. 1998).

Tangler, J.L., et al., "NREL Airfoil Families for HAWT's," *Proc. Windpower '95, American Wind Energy Assn*, Washington, D.C., pp117–123 (1995).

Corbet, D.C., et al., "Report on the Passive Control of Hortizontal Axis Wind Turbines," ETSU WN6043, Gerrad Hassan and Partners, Bristol UK, (1992).

Lobitz, D.W., "Enhanced Peformance of HAWTs Using Adaptive Blades", *Proc Wind Energy 1996, ASME Wind Energy Symposium, Houston*, Jan. 29–Feb. 2, 1996.

* cited by examiner

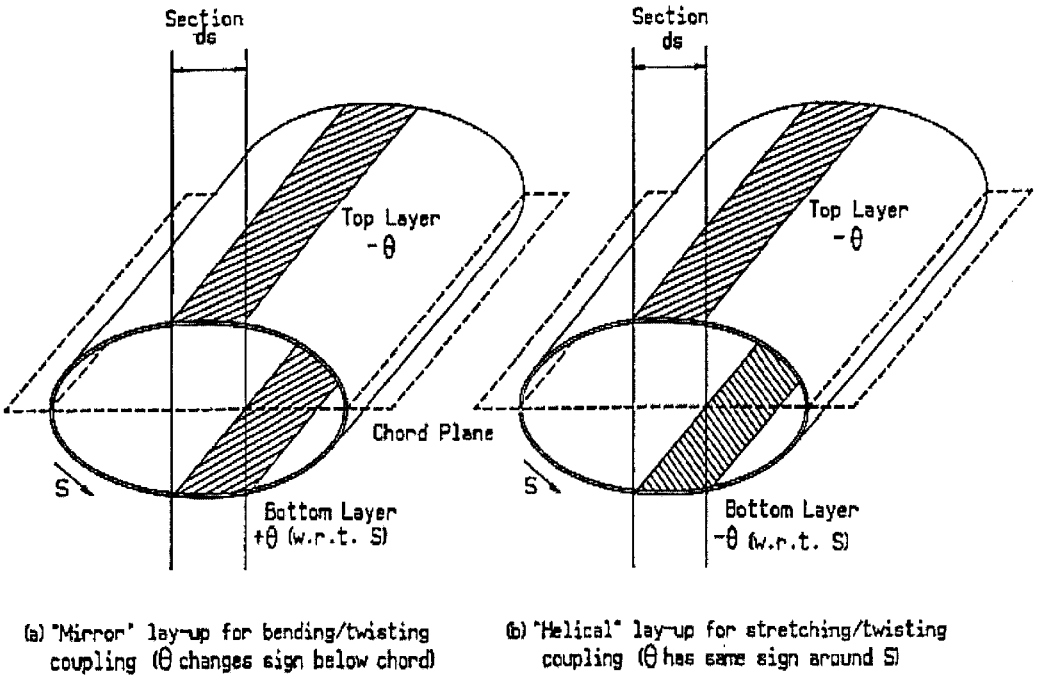
Figure 1 (Prior Art) Type of asymmetric lay-ups required to produce (a) tension-twist coupling; and (b) stretch-twist coupling

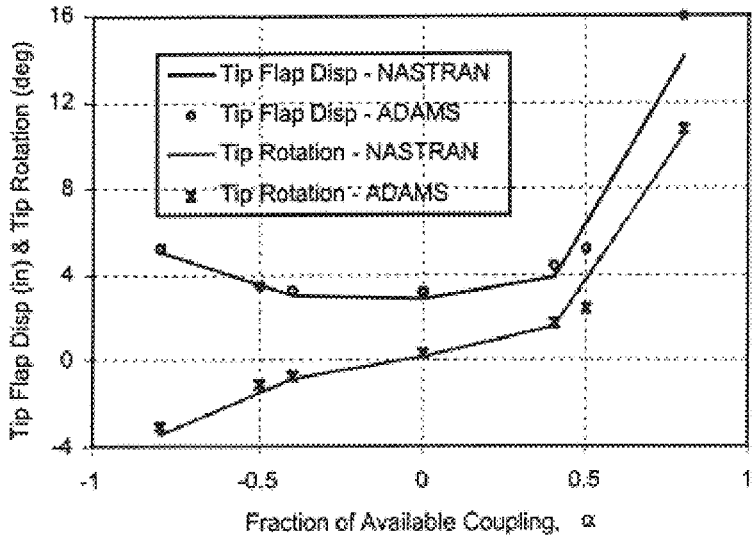
Figure 2.1. ADAMS/NASTRAN comparison for the CEB with bending-twist coupling
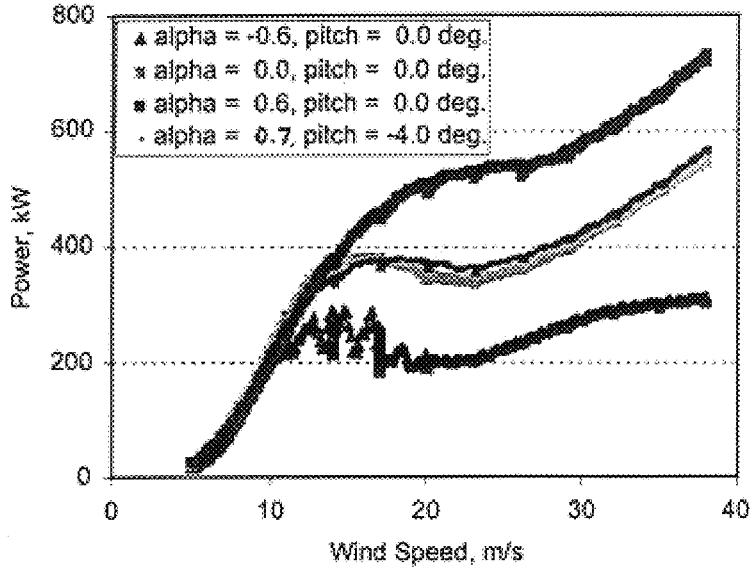
Figure 2.2. Power curves for 4 models showing effect of twist-coupling and pitch angle.

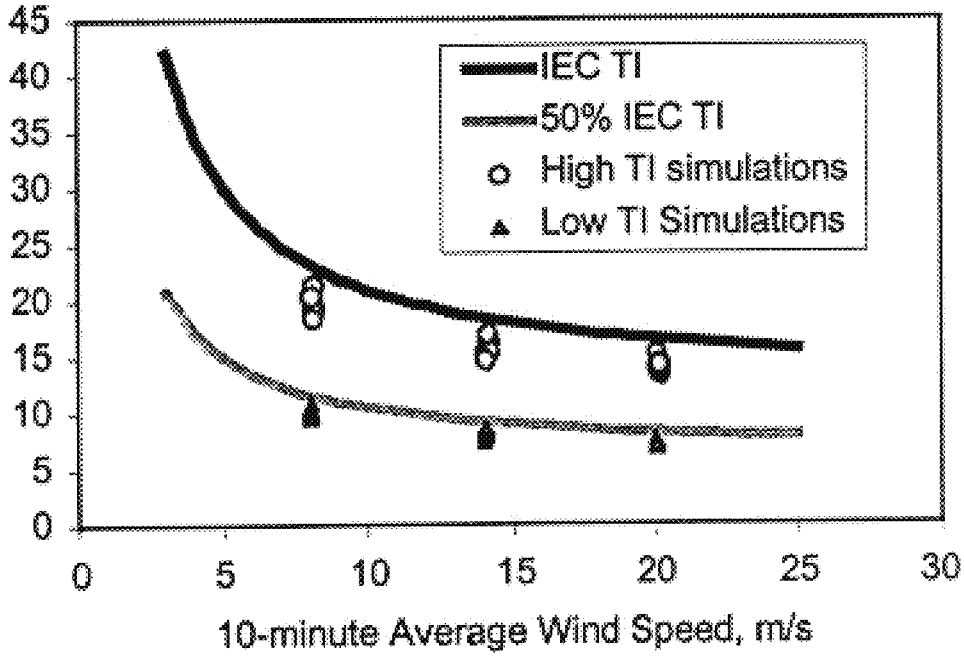
Figure 2.3. Turbulence intensity of simulated turbulence compared to IEC standard criteria.

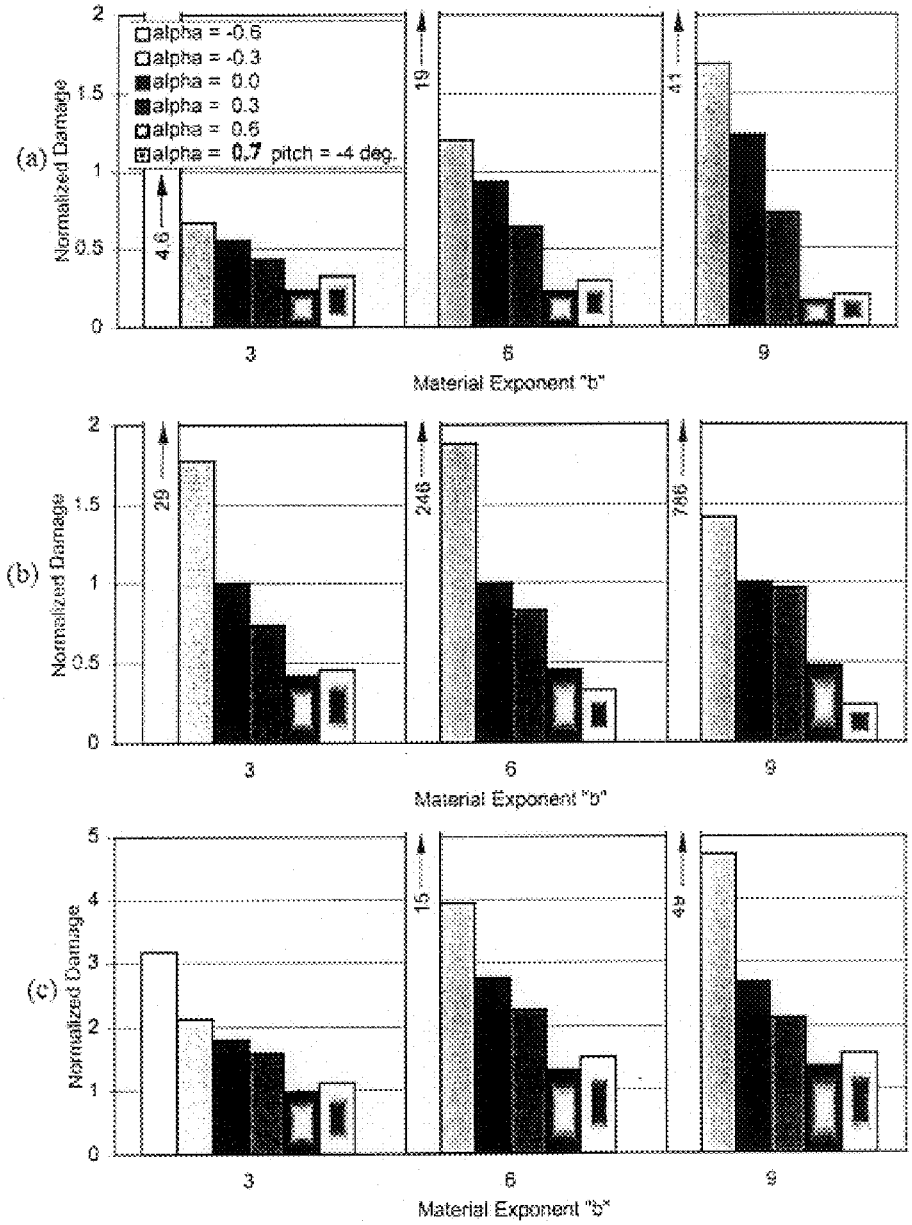
Figure 2.4. Comparison of relative fatigue damage for 6 blade models and 3 material exponents for 100 simulated minutes at (a) 8, (b) 14, and (c) 20 m/s average wind speeds with the IEC turbulence intensity.

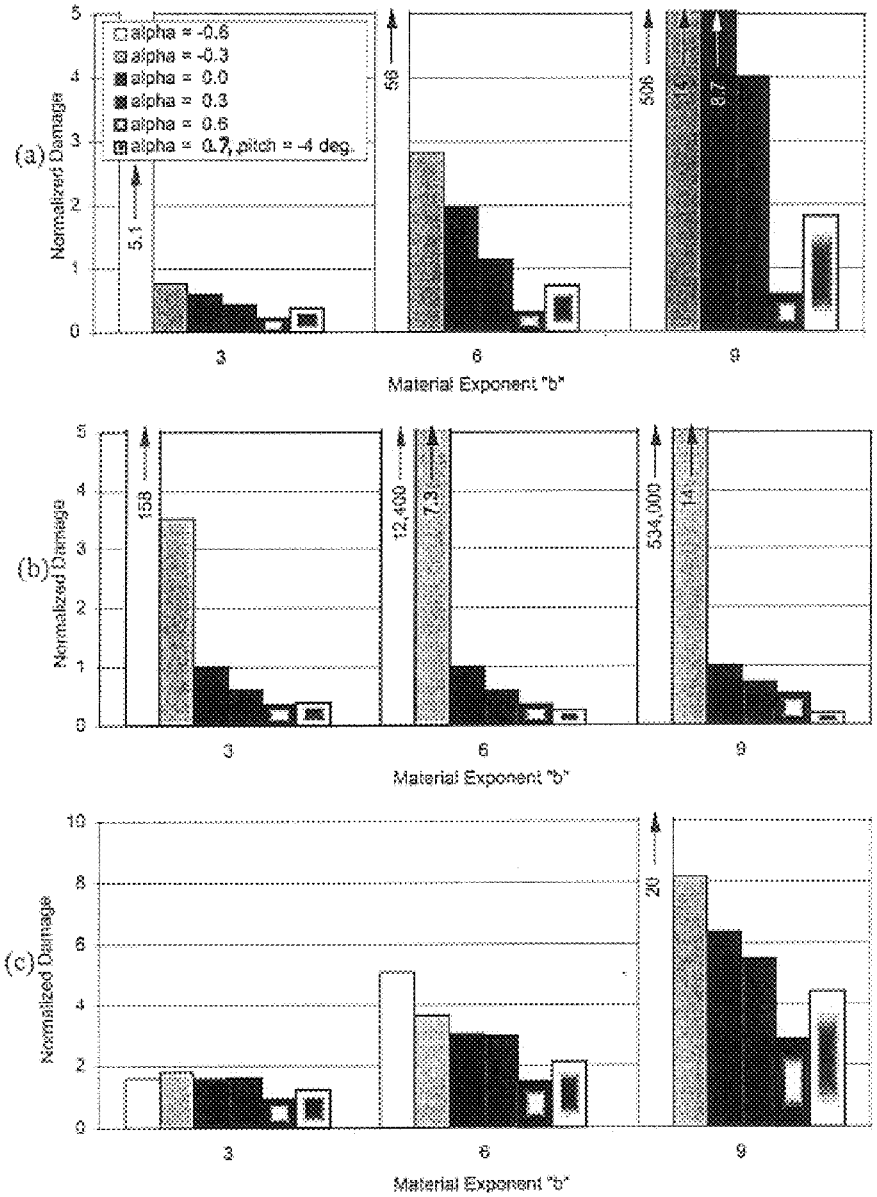
Figure 2.5. Comparison of relative fatigue damage for 6 blade models and 3 material exponents for 100 simulated minutes at (a) 8, (b) 14, and (c) 20 m/s average wind speeds with 50% of the IEC turbulence intensity.

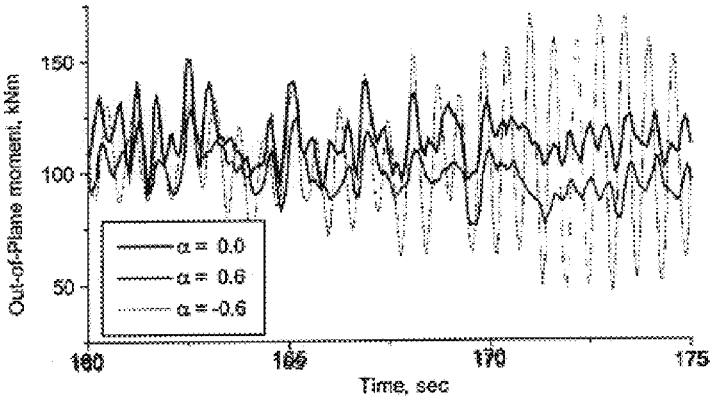
Figure 2.6. Time series plot of blade bending moment showing the instability at α = -0.6.
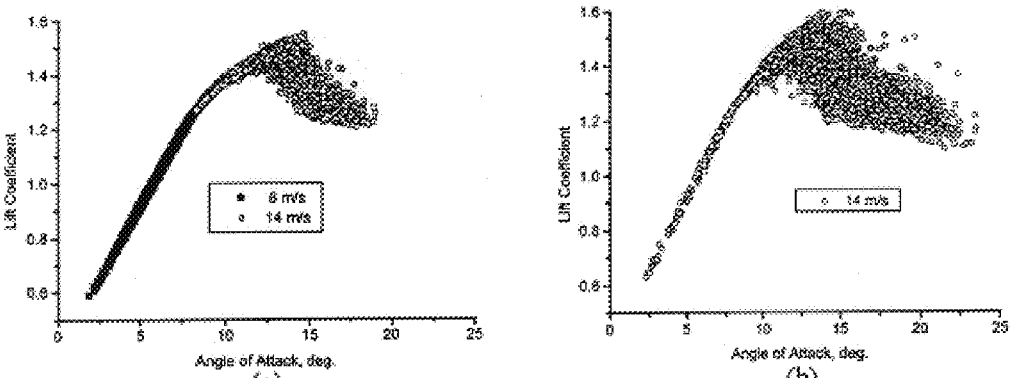
Figure 2.7. Coefficient of lift plots showing that the range for 8 m/s (solid black squares) is greater than that for 14 m/s (open gray circles) for the low turbulence case (a), and both are smaller than for the 14 m/s high turbulence case (b).

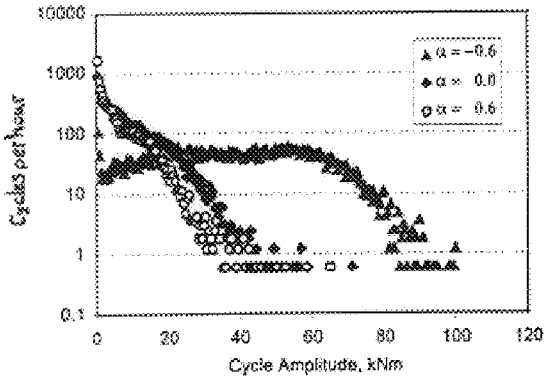
Figure 2.8. Comparison of cycle counted out-of-plane bending moments at 14 m/s average wind speed with IEC turbulence intensity.
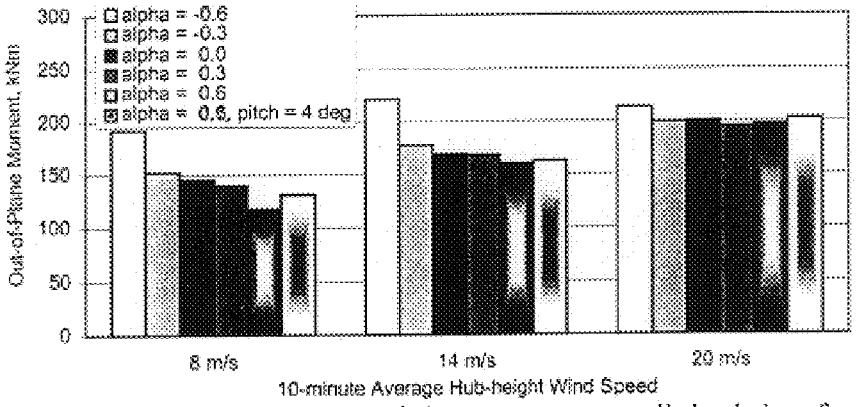
Figure 2.9. Comparison of maximum out-of-plane moments over all simulations for all models and wind speeds.

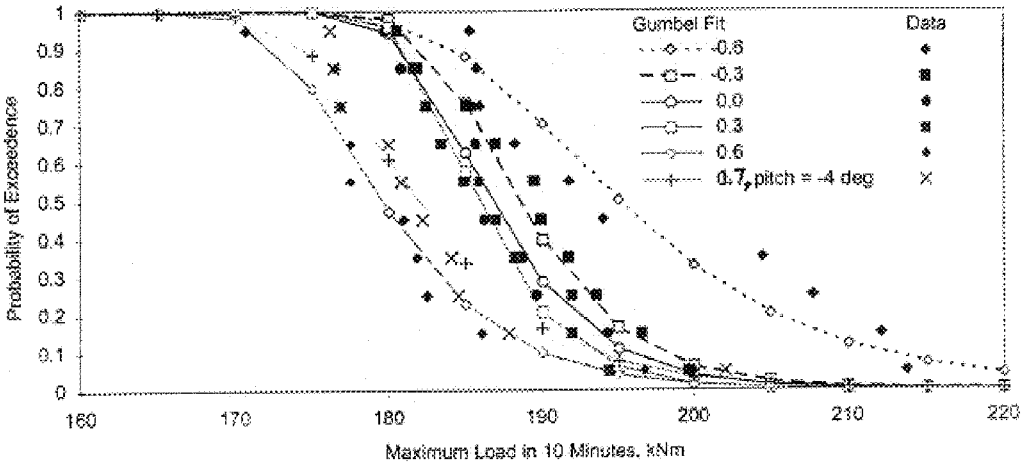
Figure 2.10. Comparison of curves of probability of exceedence in 10 minutes at 20 m/s average wind speed and associated simulation data points for maximum out-of-plane moment for all 6 wind turbine models.
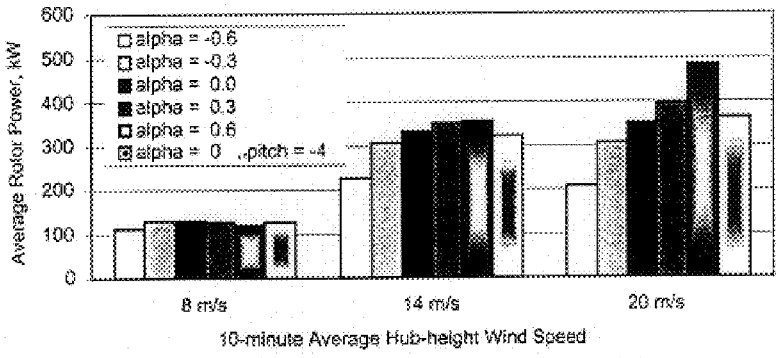
Figure 2.11. Comparison of average rotor power over all simulations for all models and wind speeds.

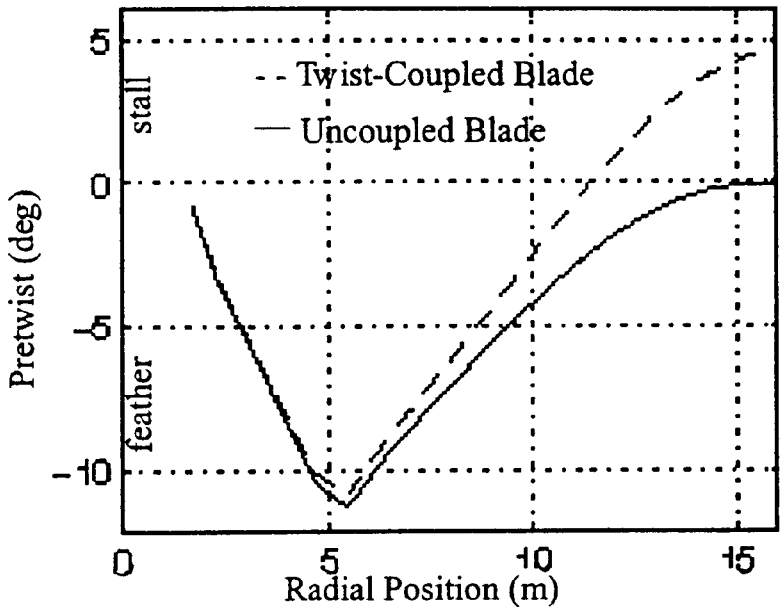
Figure 3.1: Pretwist for the twist-coupled and uncoupled blades.
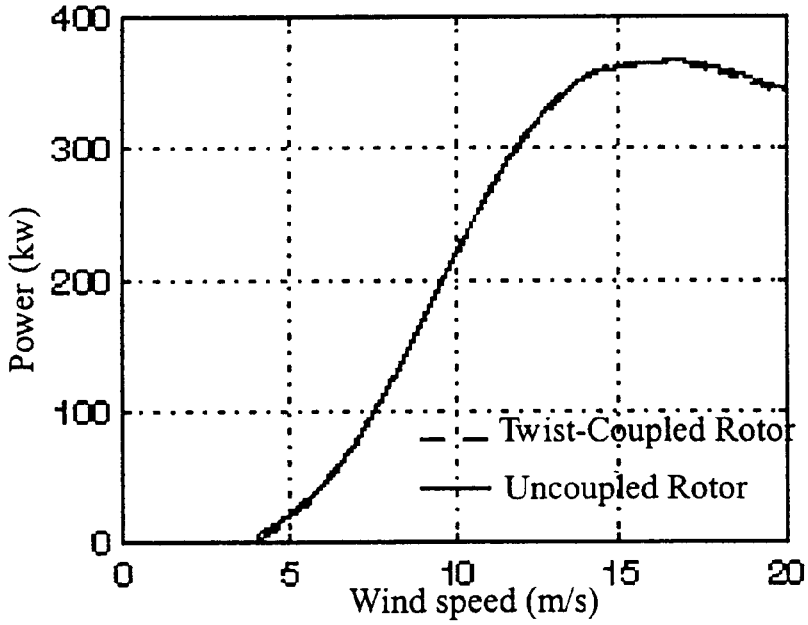
Figure 3.2: Power curves for the uncoupled rotor and the twist-coupled one with optimal pretwist.

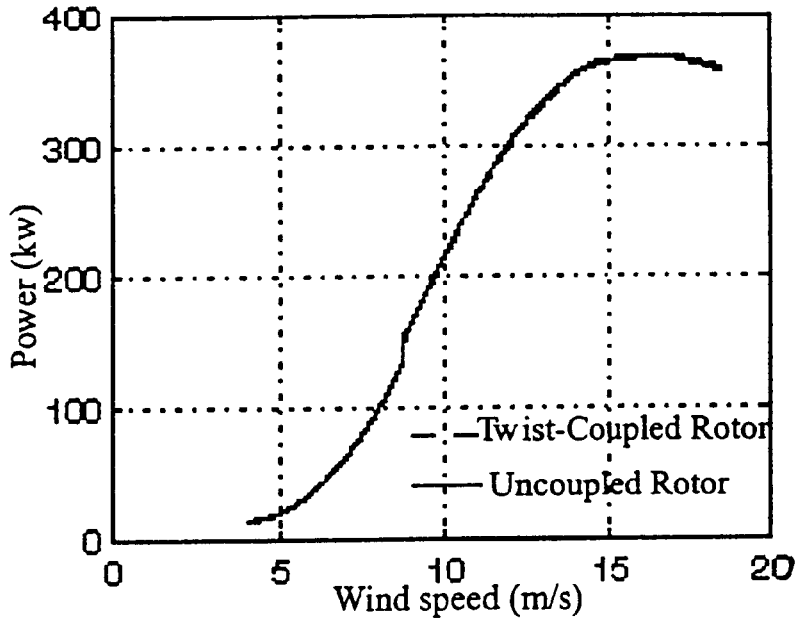
Figure 3.3: Power curves for the variable speed stall-controlled rotor with uncoupled blades and twist-coupled one with optimal pretwist.
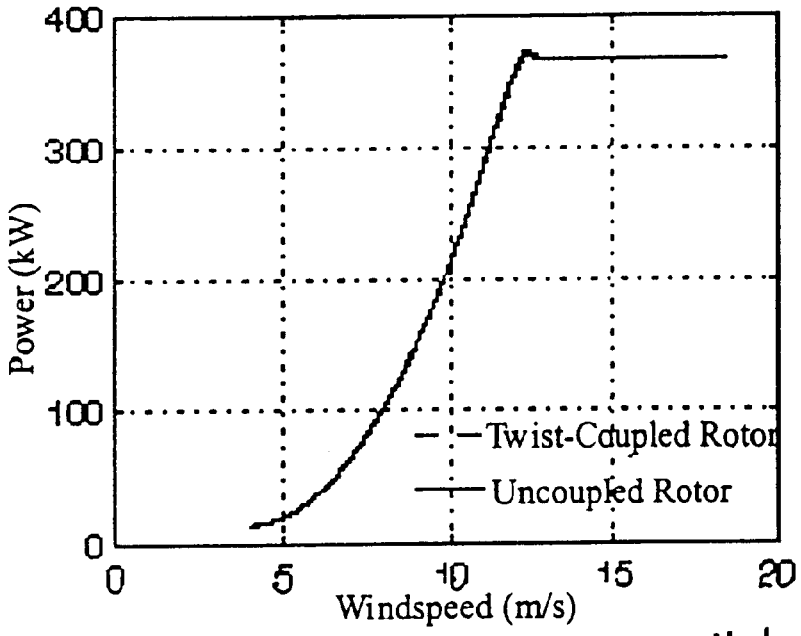
Figure 3.4: Power curves for the variable speed pitch-controlled rotor with uncoupled blades and twist-coupled one with optimal pretwist.

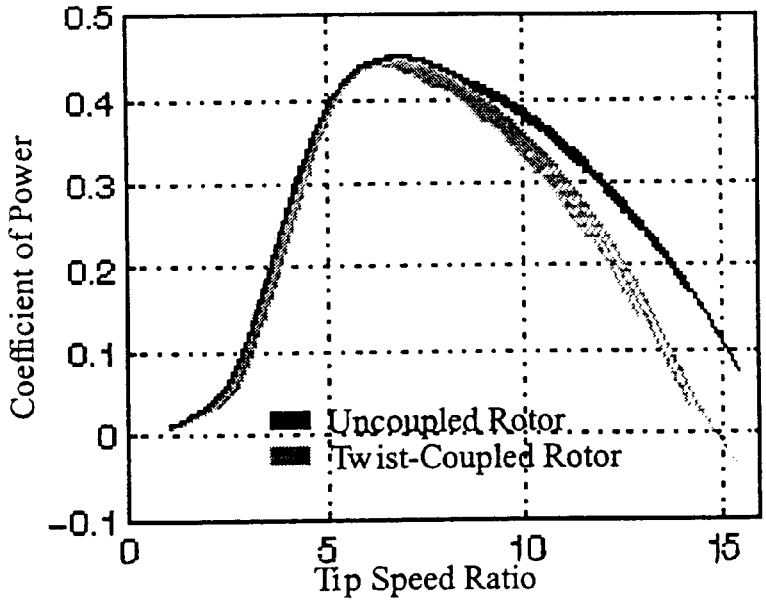
Figure 3.5: C curve families for rotor speeds from 12 to 36 RPM for the twist-coupled and uncoupled rotors.
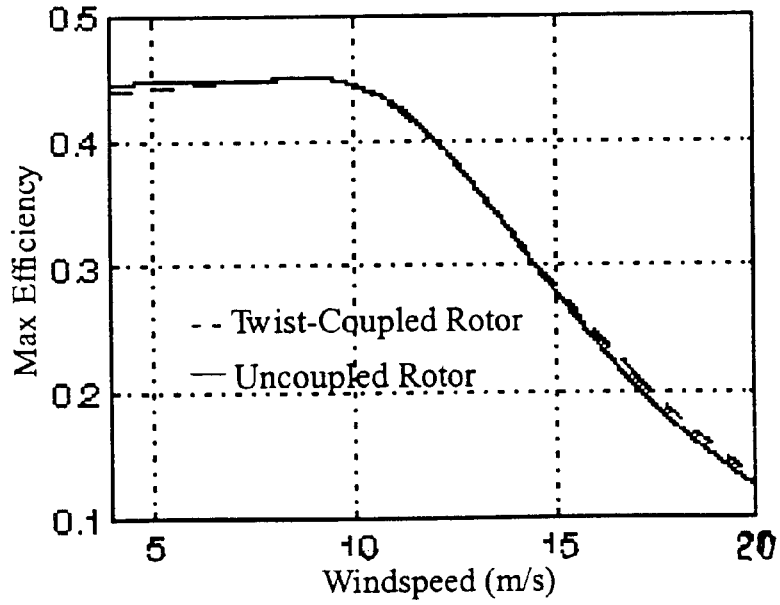
Figure 3.6: Comparison of the efficiencies of the twist-coupled and uncoupled rotors.

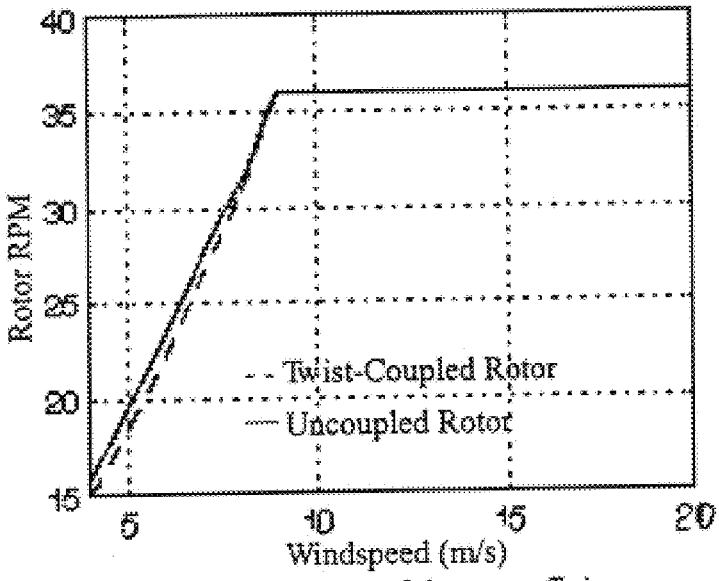
Figure 3.7: Comparison of the max efficiency RPM schedules for the twist-coupled and uncoupled rotors.
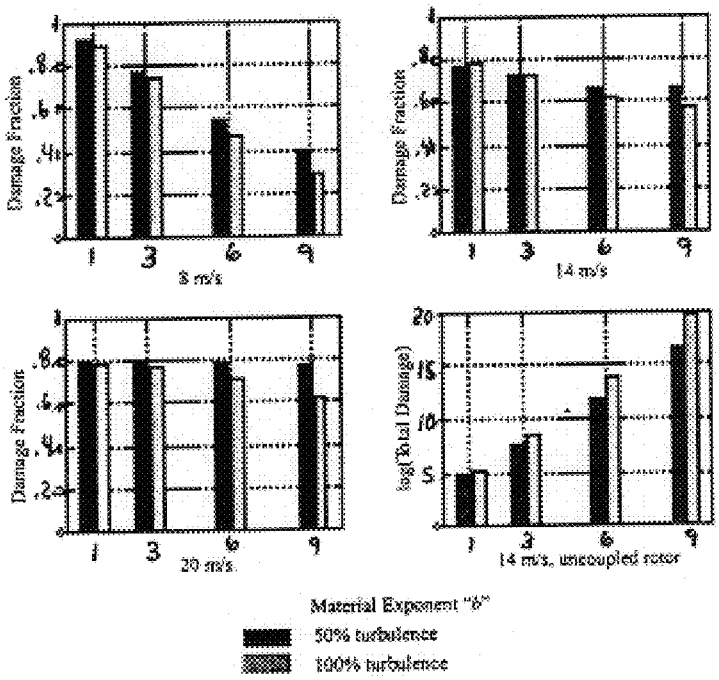
Figure 3.8. Damage fractions for the baseline constant speed stall-controlled rotor.

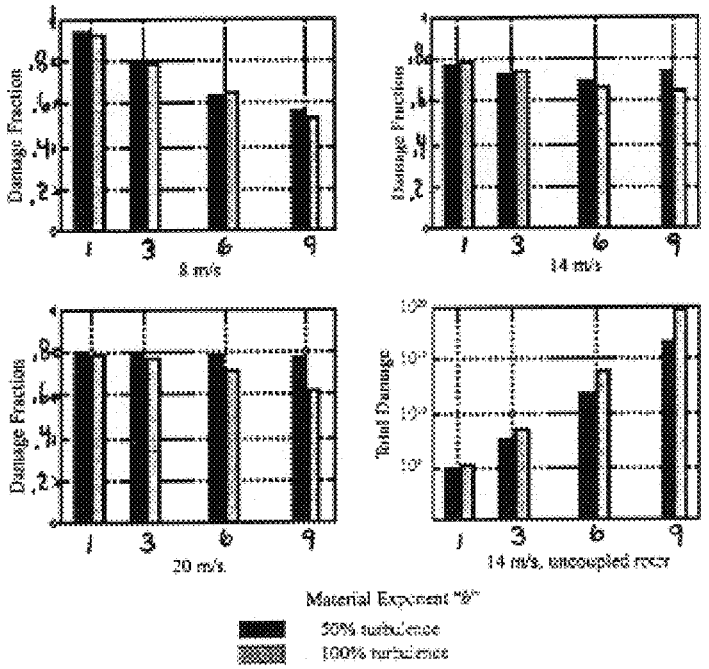
Figure 3.9. Damage fractions for the variable speed stall-controlled rotor
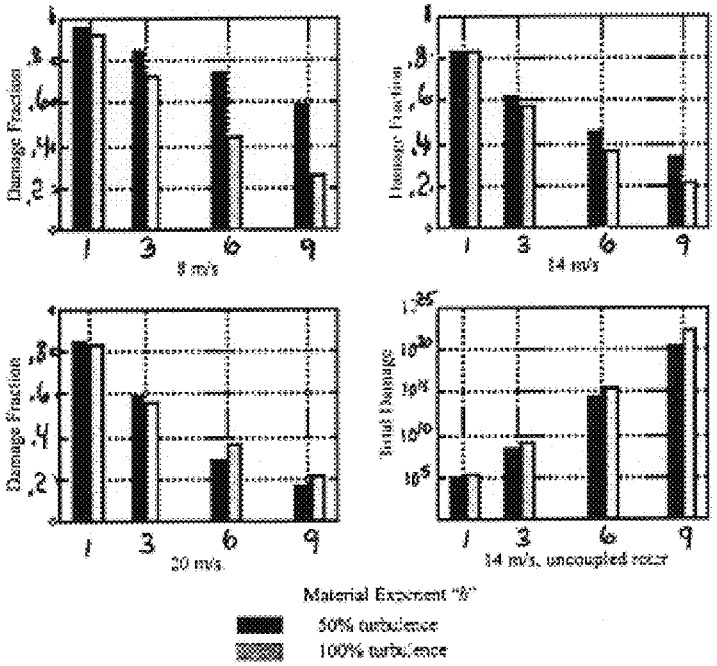
Figure 3.10. Damage fractions for the variable speed pitch-controlled rotor

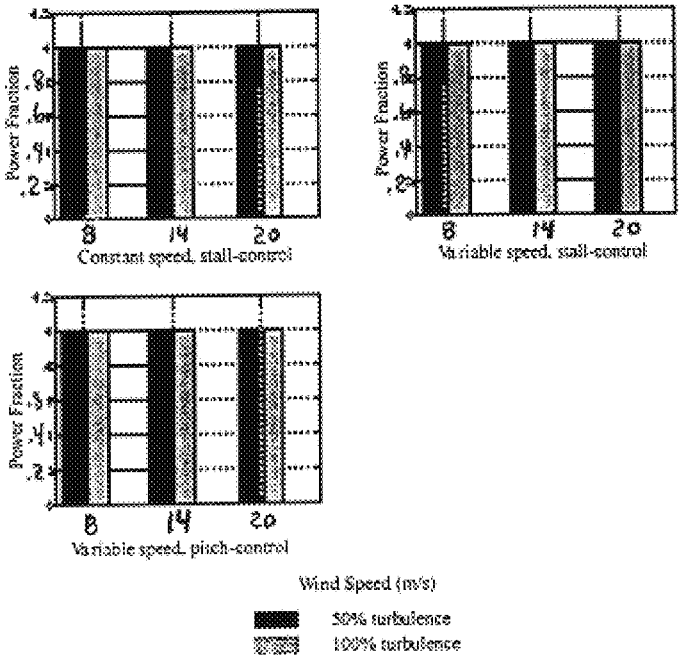
Figure 3.11. Power fractions for the twist-coupled rotor with the three control strategies.
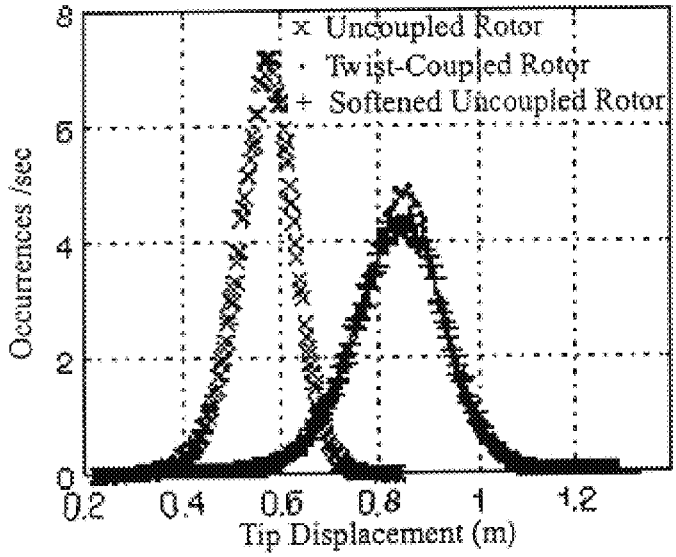
Figure 3.12: Histograms of tip displacements for the uncoupled, twist-coupled and softened uncoupled rotors (14m/s, 100% IEC turbulence intensity).

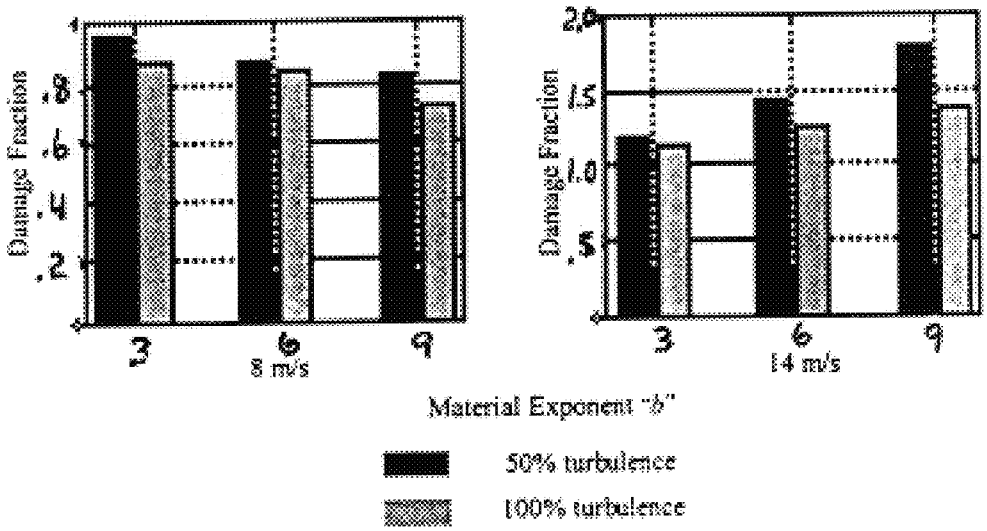
Figure 3.13. Damage fractions for the variable speed stall-controlled softened uncoupled rotor

LOAD ATTENUATING PASSIVELY ADAPTIVE WIND TURBINE BLADE

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to rotor blades, particularly wind turbine rotor blades, and specifically to an aeroelasticly tailored turbine blades.

2. Background Art

Whenever the blades on a wind turbine are twisted, the twist directly influences the blade's angle of attack, thereby changing loads and affecting output power. Classic pitch control used in not only wind turbines, but in rotors of all types, directly exploits these principles. When the pitch changes are sufficiently rapid, they can affect not only average rotor loads and turbine power, but vibratory loads as well, influencing fatigue life throughout the system. Even quite small angles of twist can have significant impact.

The general concept of rotor blades that passively adapt to the incident wind loading is not new. Mechanisms that adjusted blade angle of attack in response to the thrust loading were quite popular in the early days of the modem wind energy push of the late twentieth century. Approaches and objectives were quite varied. One effort regulated power with a centrifugally loaded mass on an elastic arm. Cheney, M. C. and Speirings, P. S. M. (1978) "Self Regulating Composite Bearingless Wind Turbine," Solar Energy, Vol. 20. Another attempt employed a system for cyclically adjusting pitch for per rev load balancing. Bottrell, G. W. (1981) "Passive Cyclic Pitch Control for Horizontal Axis Wind Turbines," Proceedings of Wind Turbine Dynamics, NASA Conf. Pub. 2185, DOE Pub. CONF-810226, Cleveland, Ohio. The North Wind 4KW had a system for passively adjusting pitch for both power and load control. Currin, H. (1981) "North Wind 4kW 'Passive' Control System Design," Proc. Wind Turbine Dynamics, NASA Pub. 2185, DOE Pub. CONF-810226, Cleveland, Ohio. Others have studied alleviating yaw loads with cyclic pitch adjustments. Hohenemser, K. H. and Swift, A. H. P. (1981) "Dynamics of an Experimental Two Bladed Horizontal Axis Wind Turbine with Blade Cyclic Pitch Variation," Wind Turbine Dynamics, NASA Pub. 2185, DOE Pub. CONF-810226, Cleveland, Ohio.

Also, a Garrad-Hassan report, for example, evaluated the use of all available blade loads to effect pitch changes that would regulate the power output of a turbine, aiming at a flat power curve in high winds. Corbet, D. C. and Morgan, C. A. (1992) "Report on the Passive Control of Horizontal Axis Wind Turbines," ETSU WN 6043, Garrad Hassan and Partners, Bristol, UK, But only pitching to feather was evaluated to avoid the vagaries of predicting power output in the post-stall regime. The conclusion was that perfect regulation is very difficult to achieve, and that even less than perfect regulation is a challenge.

Regarding the construction of passively adaptive blades, Karaolis et al. introduced the concept of using biased lay-ups in blade skins on the surface of blades to achieve different types of twist coupling for wind turbine applications. By changing the blade skin surface from an orthotropic to a biased fiber lay-up, the blade can be aeroelastically tailored with minimal disturbance to the beam stiffness properties or manufacturing costs. Karaolis suggested that in addition to using the flapwise or centrifugal loading to twist a blade, it might be useful to internally pressurize a spar and use changes in the pressure to actively control the angle of blade twist. Karaolis, N. M., Mussgrove, P. J., and Jeronimidis, G. (1988) "Active and Passive Aeroelastic Power Control using Asymmetric Fibre Reinforced Laminates for Wind Turbine Blades," Proc. 10$^{th}$ British Wind Energy Conf., D. J. Milbrow Ed., London, March 22–24, 1988; Karaolis, N. M., Jeronimidis, G., and Mussgrove, P. J. (1989) "Composite Wind Turbine Blades: Coupling Effects and Rotor Aerodynamic Performance," Proc., EWEC'89, European Wind Energy Conf., Glasgow, Scotland, 1989. FIG. 1.1 from the prior art shows how different fiber orientations in a blade skin can be used to acheive bend-twist or stretch-twist coupling. In his 1988 report, Karaolis mapped out the combinations of two direction lay-ups to maintain strength and produce twist coupling in an airfoil shape.

Middleton et al. and Infield et al.designed, analysed, fabricated and tested a "stretch- twist coupled" blade developed to control the rotor in a runaway scenario. Their composite blade was fabricated using a helical layup with layers of glass and carbon fibers. Measured twist coupling agreed well with predictions and measured runaway speeds were actually less than predicted. Middleton, V., Fitches, P. Jeronimidis, G. and Feuchtwang, J. (1998) "Passive Blade Pitching for Overspeed Control of an HAWT," Wind Energy 1998, Proceedings of the 20$^{th}$ British Wind Energy Association Conference, Cardiff University of Wales, Sep. 2–4, 1998; Infield, D. G., Feuchtwang, J. B. and Fitches, P. (1999) "Development and Testing of a Novel Self-Twisting Wind Turbine Rotor," Proceedings of the 1999 European Wind Energy Conference, pp 329–332, Nice, France, Mar. 1–5, 1999.

Another report on aeroelastic tailoring concluded that the use of aeroelastic tailoring of the Fibre Reinforced Plastics to control limited torsional deformation is a promising way to improve rotor blade design. Kooijman evaluated building the elastic coupling into the blade skin. Some of his conclusions for blades designed for the "Smart Rotor" were that: (1) Bending-twist coupling gives the potential for a few percentages of energy yield improvement for constant-speed pitch-controlled turbines and improves starting torque by 10%; (2) Optimal constant-speed pitch-controlled rotor production is obtained with the inboard span twisting to feather and the outboard 60% of the span twisting toward stall as wind speed increases; (3) The coupling is best achieved with hybrid carbon/glass reinforcement in the cross ply direction; and (4) Bending-torsion flexibility is about 10% less than a standard construction. Kooijman, H. J. T. (1996) "Bending-Torsion Coupling of a Wind Turbine Rotor Blade," ECN-I 96-060, Netherlands Energy Research Foundation ECN, Petten the Netherlands.

For constant speed rotors, enhanced stall control of wind turbines has been used in the past to improve the energy capture of rotors by allowing the rotor size to grow while maintaining a low maximum rating on other components in the system. Families of airfoils have been published that have since been used to stall regulate turbines at lower power levels with the associated reduced system cost of energy. Tangler, J. and Somers, D. (1995) "NREL Airfoil Families for HAWTs," Proc. Windpower '95, American Wind Energy Association, Washington D.C.; Klimas, P. C. (1984) "Tailored Airfoils for Vertical Axis Wind Turbines," SAND84-1062, Sandia National Laboratories, Albuquerque, N.Mex. An aeroelastically tailored blade that twists to stall in response to flap loads has a similar effect.

We have examined previously the generic coupling effects on annual energy production of a nominally 26 meter diameter stall regulated wind turbine. The blades were assumed to twist to stall, reducing maximum power. The rotor diameter was then increased to bring maximum power back up to its initial level. Twist distributions were specified by prescribing a maximum tip amplitude and a spanwise variation, varying with wind speed in either a linear or quadratic fashion. A twist proportional to power was also used. It was discovered that the details of spanwise variation or how the twist varied with wind speed (or power) had only minor impacts. The twist-coupled blades combined with larger rotors increase power in the important middle-range of wind speeds while power in high winds remains the same. Studies which investigated the increase in annual energy as a function of the annual average wind speed showed that for a maximum twist angle of one degree the energy capture is increased by about 5% and for two degrees, about 10%. The improvements are not overly sensitive to the wind resource. Lobitz, D. W., Veers, P. S., and Migliore, P. G. (1996) "Enhanced Performance of HAWTs Using Adaptive Blades," Proc. Wind Energy '96, ASME Wind Energy Symposium, Houston Tex., Jan. 29 –Feb. 2, 1996, the disclosure of which is incorporated herein by reference.

Whenever the wind turbine blade becomes aeroelastically "active," that is, the elastic deformations play a role in the aerodynamic loading, dynamic stability will be affected. We previously have addressed two of the most common stability constraints, namely classical flutter and divergence. Classical flutter is the condition where the phasing between the aerodynamic load fluctuations and elastic deformations are such that a resonant condition is achieved. Every wing will have a flutter boundary at some speed; for wind turbines the boundary is defined at the rotational speed (typically determined in still air) at which the blade will flutter. The stability margin is the difference between the flutter speed and normal operating speed. Divergence is a quasi-static condition where the blade twists in response to increasing load in a direction that further increases the load. If this condition exists on a blade there will be an operating speed at which the increase in loads caused by the deformation exceeds the ability of the blade to resist the load, called divergence. Lobitz, D. W. and Veers, P. S. "Aeroelastic Behavior of Twist-Coupled HAWT Blades," AIAA-98-0029, Proc. 1998 ASME Wind Energy Symposium held at 36$^{th}$ AIAA Aerospace Sciences Meeting and Exhibition, Reno, Nev., Jan. 12–15, 1998, the disclosure of which is specifically incorporated herein by reference.

The stability boundaries were determined with respect to the amount of twist coupling built into the blade. A coupling coefficient, $\alpha$, which varies between --and 1, was defined to facilitate the generic examination of stability effects. For a blade with bending-twist coupling, and prescribed bending and twisting stiffnesses, this coefficient represents a range for the coupling stiffness wherein the system remains positive definite.

Creating a bending twist/coupled finite element model of the 10 meter diameter NREL Combined Experiment Blade for use in the MSC NASTRAN commercial software, the flutter and divergence stability boundaries were mapped over the range of possible $\alpha$'s. Instability occurs when the design operating speed exceeds these boundaries. Results indicate that the stability boundaries are not exceeded even with coupling levels up to 80% of the theoretical maximum, although the stability margins decrease toward the extreme values of the coupling coefficient. As $\alpha$ becomes increasingly positive, the blade bends and twists toward stall, increasing angle of attack and also loads, and this reduces the divergence stability margin. Conversely, as $\alpha$ becomes increasingly negative, the blade twists toward feather reducing aeroloads and increasing the divergence stability margin. However, in this region, the classical flutter stability margin decreases, although not as severely as the divergence margin for positive $\alpha$'s. Lobitz, D. W. and Veers, P. S. (1998) "Aeroelastic Behavior of Twist-Coupled HAWT Blades," AIAA-980029, Proc. 1998 ASME Wind Energy Symposium held at 36$^{th}$ AIAA Aerospace Sciences Meeting and Exhibition, Reno, Nev., Jan. 12–15, 1998.

Twisting to feather in response to increasing winds is a known potential means to reduce the dynamic loading on the blades, and hence the rest of the system. Load reductions have been demonstrated by linking a pitch control system to flapwise blade loads using simple integral control. Eggers, A. J. Jr., Ashley, H., Rock, S. M., Chaney, K., and Digumarthi, R. (1996) "Effects of Blade Bending on Aerodynamic Control of Fluctuating Loads on Teetered HAWT Rotors," J. of Solar Energy Engr., Vol. 118, No. 4, November 1996. Eggers' results indicated that the rms blade bending response to turbulent winds could be reduced by about half. And this was accomplished with rms pitching angles of 3 degrees if ⅓ span ailerons are used and substantially less with full-span pitch control. The fatigue implications of such a substantial decrease in cyclic loading are enormous, measured in increased lifetime or reduced blade weight.

An aeroelastically twisting blade is similar to the control system investigated by Eggers in that the blade pitch angle responds to bending loads in a way similar to a proportional, rather than an integral, controller. The ability of bending-twist coupled blades to attenuate (or exacerbate) the cyclic loading was previously investigated for a 33 meter diameter rotor employing three different control strategies; constant speed stall-controlled, variable speed stall- controlled and variable speed pitch-controlled. Transient structural dynamic simulations of the bending twist/coupled rotor were carried out using the ADAMS commercial software modified to include twist/coupling. Ensembles of 10 minute turbulent wind histories were generated with the SNLWIND-3D software and used to drive the rotor. Average windspeeds of 8, 14 and 20 m/s (peak power for stall-control occurs near 17 m/s and for pitch-control near 12 m/s) were investigated for both high and low turbulence intensities. Material damage exponents of 3, 6 and 9 were used for computing damage. Lobitz, D. W. and Laino, D. J. "Load Mitigation with Twist-Coupled HAWT Blades," Proc. 1999 ASME Wind Energy Symposium held at 37$^{th}$ AIAA Aerospace Sciences Meeting and Exhibition, Reno, NV, Jan. 11–14, 1999, the entire disclosure of which is hereby incorporated by reference.

Results for the constant speed stall-controlled case indicated that twist/coupling toward stall produces significant increases in fatigue damage, and for a range of wind speeds in the stall regime apparent stall flutter behavior is observed. For twist-coupling toward feather with a coupling coefficient of magnitude, 0.6, fatigue damage is decreased by 20 to 70% with the higher percentages occurring at the lower average windspeeds. Concurrent with lower fatigue damage estimates for twist-coupling toward feather, maximum loads decreased slightly, especially for the lower average windspeeds. For the case where the pitch offset is altered to bring the power curve of the twist coupled rotor into better agreement with that of the uncoupled one, differences in average power are minimal. Lobitz, D. W. and Laino, D. J. "Load Mitigation with Twist-Coupled HAWT Blades," Proc. 1999 ASME Wind Energy Symposium held at 37$^{th}$ AIAA Aerospace Sciences Meeting and Exhibition, Reno, Nev., Jan. 11–14, 1999.

There are limits to the amount of coupling that can be achieved with asymmetric fiber lay-ups. The best direction and the maximum coupling are a function of the fiber and matrix properties. Previous efforts have indicated that stiffer fiber materials result in the higher coupling coefficients, with maximum $\alpha$ for flat plates just below 0.8 for a graphite-epoxy system and 0.6 for a glass-epoxy system. The carbon system achieves maximum coupling with all the fibers at about 20 degrees to the axis of bending while the glass maximum is at about 25 degrees. Tsai, S. and Ong, C-H. (1998), "D-Spar Blade Design and Manufacture," unpublished contractor reports, Sandia National Laboratories contract BB-6066 Stanford University. Composite, uniform, D-spars have been designed and fabricated that possess coupling coefficients in the range of 0.6. Ong, C. H. and Tsai, S. W. "Design, Manufacture and Testing of a Bend- Twist D-Spar," Proceedings of the 1999 ASME Wind Energy Symposium, Reno, Jan. 11–14, 1999, the teaching of which are hereby incorporated by reference.

There have been publicized efforts to develop a special twist/axial coupled spar that will rotate a tip mechanism through large enough angles to control power and provide some over. speed protection. Joose, P. A. and van den Berg, R. M. "Development of a TenTorTube for Blade Tip Mechanisms," P7.17, Proc., 1996 European Union Wind Energy Conf. and Exhib., Götegorg, May 20–24, 1996; van den Berg, R. M., P. A. Joosse, and B. J. C. Visser "Passive Power Control by Self Twisting Blades," Proc., European Wind Energy Association Conf. and Exhib., Thessaloniki, Oct. 10–14, 1994.

There also have been showings of how small turbines can have improved speed regulation with twist/axial coupling. Infield D. G. and J. B. Feuchtwang "Design criteria for passive pitch control of wind turbines using self-twisting blades," International Journal of Ambient Energy, Vol. 16, No. 3, July 1995; Feuchtwang, J. B. and D. G. Infield "Aerofoil profile section for passive pitch control using self-twisting blades," Wind Energy Conversion, Proc. $17^{th}$ BWEA Wind Energy Conf., ed. J. Halliday, BWEA, Warwick, Jul. 19–21, 1995. A common feature in these works is to provide relatively large rotations to achieve substantial amounts of power regulation. Most have used stretch twist coupling on variable speed systems to assist in over-speed control or power regulation and rely on large angles of twist to accomplish complete control of high wind loads.

And it has been demonstrated that even with relatively small twists (that incidentally also enhance regulation), a stall controlled, fixed pitch system could be operated with a larger rotor to achieve net energy enhancements without increasing the maximum power rating. Lobitz, D. W., Veers, P. S., and Migliore, P. G. "Enhanced Performance of HAWTs Using Adaptive Blades," Proc. Wind Energy '96, ASME Wind Energy Symposium, Houston, Jan. 29 –Feb. 2, 1996.

The reorientation of the fiber directions in the rotor blade surface skin or spar to achieve either flap-load or extension-load coupling with blade twist, thus has potential to be a cost effective and reliable aeroelastic tailoring approach. The present invention involves modest blade rotations produced by elastic twist coupling of the blade as it bends or extends without any additional mechanisms or devices. There are a number of possible uses of aeroelastic tailoring in wind turbine applications. They include stall enhancement to permit larger diameter rotors for improved average energy capture, dynamic effects including stability issues, and load alleviation through twist coupling toward feather. In the present invention, the use of elastic twist coupling in the rotor blade is exploited to alleviate loads to promote structural longevity.

The present invention exploits modest twist angles to produce load alleviation and perhaps power regulation or enhancement through bend/twist coupling. The manufacturing process will depend on the type of coupling to be produced. Fiber winding is well suited to producing stretch-twist coupling in a spar, while clam-shell construction with the top and bottom skins manufactured separately is best suited to bend-twist coupling.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 1 is a diagram from the prior art, showing the types of asymmetric fiber lay-ups on rotor blades required to produce bending-twist and tension-twist coupling;

FIG. 2.1 is a line graph showing a ADAMS/NASTRAN comparison for the Combined Experiment Blade with bending-twist coupling, with tip flap displacement a function of the fraction of available coupling;

FIG. 2.2 is a line graph showing power curves (power as a function of wind speed) for four models according to the present invention, showing the effect of twist-coupling and pitch angle on power;

FIG. 2.3 is a line graph of turbulence intensity of simulated turbulence compared to International Electrotechnical Commission standard criteria;

FIGS. 2.4(*a*)–(*c*) are bar graphs illustrating comparisons of relative fatigue damage for six blade models according to the present invnetion, and three material exponents for 100 simulated minutes, at (a) 8, (b) 14, and (c) 20 m/s average wind speeds with the International Electrotechnical Commission turbulence intensity;

FIGS. 2.5(*a*)–(*c*) are bar graphs illustrating comparisons of relative fatigue damage for six blade models according to the present invention and three material exponents for 100 simulated minutes at (a) 8, (b) 14, and (c) 20 m/s average wind speeds with 50% of the International Electrotechnical Commission turbulence intensity;

FIG. 2.6 is a line graph depicting a time series plot of blade bending moment showing the instability at coupling coefficient $\alpha=-0.6$;

FIG. 2.7(*a*) and (*b*) are coefficient of lift plots showing that the range for 8 m/s (solid black squares) is greater than that for 14 m/s (open gray circles) for the low turbulence case (a), and both are smaller than for the 14 m/s high turbulence case (b), for model blades according to the present invention.

FIG. 2.8 is a graph showing comparisons of cycle counted out-of-plane bending moments at 14 ms average wind speed with International Electrotechnical Commission turbulence intensity;

FIG. 2.9 is a bar graph comparing maximum out-of-plane moments over all simulations for all models of the inventive blade and wind speeds;

FIG. 2.10 is a line graph comparison of curves of probability of exceedence in ten minutes at 20 m/s average wind speed and associated simulation data points for maximum out- of-plane moment for all six wind turbine models of the inventive blade;

FIG. 2.11 is a bar graph comparing average rotor power over all simulations for all models of the inventive blade and wind speeds;

FIG. 3.1 is a line graph comparing pretwist for the twist-coupled inventive blades and uncoupled blades;

FIG. 3.2 is a line graph plotting the power curves for the uncoupled rotor and the twistcoupled inventive blade with optimal pretwist;

FIG. 3.3 is a line graph plotting power curves for a variable speed stall-controlled rotor with uncoupled rotors and a twist-coupled inventive rotor blade with optimal pretwist;

FIG. 3.4 is a line graph plotting power curves for a variable speed pitch-controlled rotor with uncoupled blades and a twist-coupled blade according to the invention with optimal pretwist;

FIG. 3.5 is a graph plotting comparative $C_p$ curve families for rotor speeds from 12 to 36 RPM for the twist-coupled rotor according to the present invention and uncoupled rotors;

FIG. 3.6 is a graph comparing the efficiencies of the twist-coupled rotors according to the present invention and uncoupled rotors;

FIG. 3.7 is a line graph comparing the max efficiency RPM schedules for the twist- coupled rotors according to the present invention and uncoupled rotors;

FIG. 3.8 shows bar graphs of the damage fractions for the baseline constant speed stall-controlled controlled rotor;

FIG. 3.9 shows bar graphs of the damage fractions for a variable speed stall-controlled rotor;

FIG. 3.10 shows bar graphs of the damage fractions for a variable speed pitch- controlled rotor;

FIG. 3.11 shows bar graphs of power fractions for the twist-coupled rotor according to the present invention with three stall-control strategies;

FIG. 3.12 shows histograms of tip displacements for uncoupled, twist-coupled and softened uncoupled rotors at (14m/s, 100% International Electrotechnical Commission turbulence intensity); and FIG. 3.13 shows bar graphs of damage fractions for a variable speed stall-controlled softened uncoupled rotor.

DESCRIPTION OF THE PREFERRED EMBODIMENTS (BEST MODES FOR CARRYING OUT THE INVENTION)

Whenever wind turbine blades twist, there is a direct influence on the angle of attack, changing loads and affecting output power. This is directly exploited in classic pitch control used in not only wind turbines but in rotors of all types. When the pitch changes are rapid enough, they can affect not only average loads and power, but vibratory loads as well, influencing fatigue life throughout the system. Even quite small angles of twist can have significant impact.

Broadly described, the present invention is a method and apparatus for improving wind turbine performance by alleviating loads and controlling the rotor. The invention employs the use of an passively adaptive blade that senses the wind velocity or rotational speed, and accordingly modifies its aerodynamic configuration. The passive approach is much more attractive due to its simplicity and economy. As an example, a blade design might employ coupling between bending and/or extension, and twisting so that, as it bends and extends due to the action of the aerodynamic and inertial loads, it also twists modifying the aerodynamic performance in some way. Thus, the invention exploits the load mitigation prospects of a blade that twists toward feather as it bends. Stall regulation is more difficult if not impossible with the blade, and therefore some other means of regulating the maximum power output of a given sized rotor is recommended. One possibility is variable speed operation which is becoming increasingly more popular with wind turbine designers. The invention includes passively adaptive wind turbine rotors or blades with currently preferred stall-control features.

Wind turbines must operate in the presence of atmospheric turbulence which results in cyclic loads that fatigue the structure and produce extreme loads requiring high structural strength. As mentioned, traditionally no attempts have been made to reduce those loads through aeroelastic tailoring, and only recently has aeroelastic tailoring even been considered as a mode of improving turbine blade performance. In the current invention, a composite fiber horizontal axis wind-turbine blade, in which a substantial majority of fibers in the blade skin are inclined at angles of between 15 and 30 degrees to the axis of the blade, produces passive adaptive aeroelastic tailoring to alleviate loading without unduly jeopardizing performance.

The top and bottom fibers are inclined in the same direction, each producing a "mirror" image of the other, thus presenting a "herring-bone" pattern at the leading edge of the blade. This inclination results in twist/flap coupling, i.e. a load that bends the blade in the flap direction will also induce a twist deflection. The orientation of the coupling is such that an increasing upward flap deflection results in a nose-down twist. General concepts and methodologies for constructing twist-coupled rotor blades are described at, for example, in Karaolis, N. M., Mussgrove, P. J., and Jeronimidis, G. "Active and Passive Aeroelastic Power Control using Asymmetric Fibre Reinforced Laminates for Wind Turbine Blades," Proc. $10^{th}$ British Wind Energy Conf., D. J. Milbrow Ed., London, Mar. 22–24, 1988; Karaolis, N. M., Jeronimidis, G., and Mussgrove, P. J. "Composite Wind Turbine Blades: Coupling Effects and Rotor Aerodynamic Performance," Proc., EWEC'89, European Wind Energy Conf., Glasgow, Scotland, 1989; and Ong, C. H. and Tsai, S. W. "Design, Manufacture and Testing of a Bend-Twist D-Spar," Proceedings of the 1999 ASME Wind Energy Symposium, Reno, Jan. 11–14, 1999 (directed and sponsored by the assignee of the present application).

Such coupling in the rotor blade apparatus according to the invention results in attenuation of dynamic loads such that the cycling loading due to turbulence is reduced in all circumstances, and the extreme loads due to operation in turbulence are also reduced. This reduced cyclic loading extends the fatigue life of the blade as well as the other load bearing structures in the turbine apparatus. The inventive blade is designed with extra twist while unloaded such that when the blade is operated in winds near peak desired efficiency, the blade has untwisted under load to a traditionally optimal twist distribution. As the following examples illustrate by sophisticated modeling, load attenuation has been found to occur in every situation of blade operation and turbulence level. Maximum load attenuation is attained on wind turbines where power regulation is achieved with pitch-controlled operation in high winds.

Industrial Applicability

The invention is further illustrated by the following non-limiting examples, wherein computer simulations were employed to model the behavior of the inventive rotor blade.

Example 1

The analysis for the bending-twist coupled blade according to the invention was carried out within the confines of beam finite element theory. The coupling terms for the beam elements are generated starting with beam "stress- strain" relations. For bending-twist coupling the "stress-strain" relations at a point along the blade span are given by Equation 1:

$$\begin{bmatrix} EI & -g \\ -g & GK \end{bmatrix} \begin{bmatrix} \frac{\partial\theta}{\partial x} \\ \frac{\partial\varphi}{\partial x} \end{bmatrix} = \begin{bmatrix} M_b \\ M_t \end{bmatrix}$$

Here, $\theta=\delta\upsilon/\delta x$ is the flapwise slope of the blade, $\upsilon$ is the flapwise displacement, $M_b$ is the flapwise bending moment, $\psi$ is the blade twist, and $M_t$ is the twisting moment. The material parameters E and G are the Young's modulus and the shear modulus respectively; I represents the moment of inertia of the cross section and K the torsional moment of inertia (equal to the polar moment of inertia for circular sections). The quantity g, is the coupling term, and has a value of zero for the standard beam where no coupling is present. In order for this system to be positive definite (i.e., the determinant of the matrix of Equation 1 must be greater than zero) g is taken to be:

$$g=\alpha\sqrt{EIGK}$$

where $$-1<\alpha<1$$

The coupling coefficient, $\alpha$, provides for variable coupling within the designated limits. Past experience suggests that $\alpha$ may be limited to $-0.6<\alpha<0.6$. Ong, C. H. and Tsai, S. W. (1999) "Design, Manufacture and Testing of a Bend-Twist D-Spar," Proceedings of the 1999 ASME Wind Energy Symposium, Reno, Jan. 11–14, 1999. Only bending in the flapwise direction is accounted for in Equation 1 above. Bending in the edgewise direction is considered to be small relative to the flapwise direction, yielding minimal coupling. Axial extension is also ignored for this type of coupling.

The example was implemented using ADAMS/WT and ADAMS/SOLVER software, which are commercially available from Mechanical Dynamics, Inc., of Ann Arbor, Mich. In order to use the ADAMS/WT software (see *ADAMS/WT User's Guide*, Version 1.50, February 1997) to create rotor models for subsequent analysis with ADAMS (ADAMS/SOLVER Reference Manual, 1994) coupled with AERODYN (see Hansen, A. C. (1998) *AeroDyn for ADAMS User's Guide*, Version 11.0, University of Utah, Salt Lake City, Aug. 31, 1998), modifications to incorporate the coupling in the "tapered beam" stiffness matrix were required. These modifications involved replacing the $k_{46}$ and $k_4$ elements of the matrix, which are normally zeroed, with the expression given below:

$$\left|\frac{-(\alpha_L+\alpha_0)[(EI_L+EI_0)(GK_L+GK_0)]^{\frac{1}{2}}}{4L}\right|$$

The subscripts L and 0 refer to the quantities evaluated at either end of the element. Further explanation of the other parameters in this expression can be found in the ADAMS/WT User's Guide. The coupling coefficient parameter $\alpha$ was also added to the "Rotor Blade Data File" to facilitate model input and provide for a coupling coefficient that varies with blade span. The above expression provided a mean value for the coupling in each blade element. As the mean value is only exact for the case of a uniform blade, the positive definiteness of the stiffness matrix may not be preserved for non-uniform blades with high absolute values of the coupling coefficient (e.g. $|\alpha|>0.9$).

To verify that the coupling is incorporated in ADAMS/WT correctly, results for the Combined Experiment Blade (CEB) reported by us in "Aeroelastic Behavior of Twist-Coupled HAWT Blades," AIAA-98-0029, Proc. 1998 ASME Wind Energy Symposium held at $36^{th}$ AIAA Aerospace Sciences Meeting and Exhibition, Reno, Nev., Jan. 12–15, 1998, were reproduced with ADAMS. These results are associated with the CEB turning in still air over a range of bending-twist coupling levels. Blade tip rotations and deflections are shown in FIG. 2.1 as a function of $\alpha$ for both the previously generated NASTRAN results and the current ADAMS results. The favorable agreement between the two provided confidence that the ADAMS modeling was correct. Using a twist-coupled model of a representative stall-regulated rotor operating at a constant speed, ADAMS was exercised using stochastic wind time series generated with SNLWIND- 3D (see Kelley, N. D. (1993) "Full-Vector (3-D) Inflow Simulation in Natural and Wind Farm Environments Using an Expanded Version of the SNLWIND (Veers) Turbulence Code," Proceedings of the 12th ASME Wind Energy Symposium, Houston, 1993) for hub-height mean wind speeds of 8 m/s, 14 m/s and 20 m/s. These wind speeds represent the linear aerodynamic, stall and post stall regions of the power curve, respectively.

Two turbulence levels were used in these example simulations, one representing the current International Electrotechnical Commission (IEC) Class I standard and the other at 50% of that standard. These levels represent a relatively turbulent and a relatively benign site, respectively. With these wind loadings, computations were completed for several values of the bending-twist coupling coefficient within a range that assured positive definiteness of the structural stiffness. These coupling coefficients were $\alpha=-0.6, -0.3, 0.0, 0.3$, and 0.6, with $\alpha=0.0$ corresponding to the uncoupled case. Load histories and power output were computed and stored for all of the above cases for subsequent processing.

Fatigue damage estimates were computed for these load histories assuming that damage is proportional to the load cycle amplitude raised to a material exponent, b. The parameter b is often used to define the fatigue behavior of a material that follows the trend:

$$\left|N \propto S^{-b}\right|$$

where S is the stress amplitude and N is the number of cycles to failure.

Values for b of 3, 6, and 9 were used to represent a range of materials from welded steel to aluminum to composites. The damage is assumed to be cumulative and therefor Miner's Rule was invoked. Damage results for the various levels of bending-twist coupling were compared to the uncoupled case. Average power levels and maximum load levels were also compared.

The rotor model created using ADAMS/WT employed fully flexible blades comprised of 20 elements each. All other model parts and interconnections were rigid. Parameters for the basic model are presented in Table 1. The blade was based on an existing 15 m-blade design, modified only to include the twist-coupling. No attempt was made to optimize this blade.

TABLE 1

Model Configuration Sumary.

| Parameter | Value |
|---|---|
| Number of blades | 3 |
| Rotor configuration | upwind |
| Yaw configuration | fixed |
| Blade length | 14.9 m |
| Rotor hub radius | 1.5 m |
| Rotor precone angle | 0 deg |
| Rotor radius | 16.4 m |
| Rotor hub height | 50.0 m |
| Rotor tilt angle | 0 deg |
| Rotor rotational speed (constant) | 32 rpm |

Models were created in ADAMS/WT for each of the five twist-coupling, α, values recited earlier. The pitch angle of the majority of these models was a constant 0.0 degrees. Power curves for three of these models are shown in FIG. 2.2. Because α affects blade twist and therefore stall, it also affects the power curve for the model, as shown in FIG. 2.2. An additional model was created for α=0.7 with a blade pitch of −4 degrees, to limit the peak power, and hence drivetrain loading, to that of the α=0.0 model. The power curve for this model is also shown in FIG. 5.2. A noteworthy feature of the α=−0.6 power curve seen in FIG. 2.2 is the instability near peak power (12–18 m/s), which apparently results from the onset of stall flutter.

Simulated turbulence was created using SNLWIND-3D for 3 average wind speeds as discussed earlier. Inputs to the program were chosen to duplicate conditions specified in the IEC standard. Shear velocity input was used to vary turbulence intensity. Ten 10-minute wind data sets were created at each wind speed for IEC turbulence intensity level, each using a different seed or initiation point for the random process utilized in generating the time series. Ten additional 10-minute turbulence files were created at each wind speed with the turbulence intensity set to 50% of IEC levels. FIG. 2.3 compares the turbulence intensities of the simulated turbulence with the IEC criteria. In all, a total of 100 minutes of simulated turbulence at each mean wind speed and turbulence level were created. Thus, with the six models investigated, a total of 3600 simulated minutes—comprised of 360 10-minute simulations—were used in the analysis.

Results demonstrated in the simulation included fatigue damage, average power and maximum load for the various cases. In addition to the damage estimates, sample load spectra are herein disclosed. A sample load time history is also included of interest to show the development of a possible stall flutter instability.

FIGS. 2.4(*a*), 2.4(*b*), and 2.4(*c*), and FIGS. 2.5(*a*), 2.5(*b*), and 2.5(*c*) summarize the fatigue damage for most of the simulations for a blade according to the invention. FIG. 2.4 discloses the results for the high turbulence intensity corresponding to the IEC standard, while FIG. 2.5 for half of that turbulence level. The damage was computed for the out-of-plane root bending moment only, since the loads were generally highest at that location. Loads due to blade twist were not considered in the damage computation. For each turbulence intensity the damage was normalized to the damage that occurs for the 14 m/s wind speed and α=0.0. Thus in FIGS. 2.4 and 2.5b, the damage associated with the α=0.0 bar is set to unity for all three values of the material exponent. In all cases positive α indicates twisting toward feather, and negative α, toward stall.

Attention is invited to FIGS. 2.4(*b*) and 2.5(*b*). It is apparent therefrom that twisting to stall dramatically increases fatigue damage for the 14 m/s wind speed, probably as the result of an apparent stall flutter instability that occurs for negative α in the stall and post stall wind regimes. As mentioned, the power curve for α=−0.6 in FIG. 2.2 shows a region of instability from approximately 12 m/s out to 18 m/ s. This instability is also apparent in the time series plot of FIG. 2.6 for the out-of-plane moment. Here the frequency of the instability is approximately 1.7, Hz which is close to the frequency of the first bending-twist coupled mode of the α=−0.6 blade, as listed in Table 2.

TABLE 2

Non-Rotation Blade 1st Flap Freqs

| α | −0.6 | −0.3 | 0.0 | 0.3 | 0.6 |
|---|---|---|---|---|---|
| Freq (hz) | 1.69 | 2.25 | 2.39 | 2.22 | 1.65 |

For the 8 m/s and 20 m/s wind speeds, coupling toward stall still carried a high damage penalty, although not as dramatic as that for the 14 m/s wind speed, where stall events occur more often. Thus, comparing damage results for α=0.0 and α=0.6 (twisting toward feather), there was at least a factor of two reduction in damage in almost all cases with significantly greater reductions for the 8 m/s wind speed. For the case of α=0.3 the reductions in damage were proportionately much less than for those of α=0.6, especially for the 20 m/s wind speed. In general, the trend of reduced relative damage with increasing α was roughly independent of the material exponent.

FIGS. 2.5(*a*) and (*b*) show the result that the relative damage for b=6 and 9 was greater for some α's at 8 m/s than at 14 m/s. This is due to differences in the range of lift coefficient realized at different wind speeds and turbulence levels. For low turbulence, it was determined that at 8 m/s the blade operated in the linear part of the lift curve, covering a range from 0.6 to 1.4. At 14 m/s, the blade operated in stall transition covering the smaller range from 1.2 to 1.6. Therefore, although the loads were in general greater at 14 m/s, loads cycles were actually larger at 8 m/s. Thus, the lift curve range for 14 m/s was much greater for the higher turbulence level—0.6 to 1.6 —than for the lower turbulence level, hence this result of higher damage at lower wind speed is not evident in FIG. 24.

FIG. 2.8 shows load spectra for α =−0.6, 0.0, and 0.6 for the 14 m/s average wind speed with IEC turbulence intensity. Cycle amplitude clearly increases with decreasing α, and the effect of the instability for α=−0.6 mentioned above is dramatic.

FIG. 2.9 provides comparisons of the maximum bending moments that occur in each time series for the various α's and average wind speeds. For each wind speed the maximum load for α=0.6 is somewhat less than that for α=0.0. The random nature of the turbulence, however, can make such a direct comparison of maximum values misleading. A preferable manner of comparing the maxima is using probability of exceedence curves. These were calculated using a Gumbel distribution fit from the FITS routine (see Kashef, T. and Winterstein, S. R (1998) *Moment Based Modeling and Extreme Response Estimation—The FITS Routine*, Report No. RMS-31, Civil Engineering Dept., Stanford University, 1998), and are shown in FIG. 2.10 for the 20 m/s case. It is clear that the probability of exceeding a given maximum load value tends to decrease with increasing α.

FIG. 2.11 shows the average power for the various cases and, except for the average wind speed of 8 m/s, the average power is greater for $\alpha$=0.6 than for $\alpha$=0. This result is consistent with the power curves of FIG. 2.2. Thus, we have determined that for a blade that twists to feather as it bends, with a bending-twist coupling coefficient of $\alpha$=0.6, the rotor produces equivalent average power and simultaneously experiences smaller maximum loads and half the fatigue damage when compared to the uncoupled blade.

To obtain a more rigorous comparison, the blade pitch of the above-described inventive twist-coupled rotor was adjusted toward stall to obtain a power curve similar to the curve for the uncoupled rotor. This was accomplished by setting the pitch of the twist-coupled rotor to −4.0 degrees. The resulting power curve, shown in FIG. 2.2, is in reasonable agreement with the one for the uncoupled rotor. As shown in FIG. 2.9, the maximum loads for the pitched blade rotor with $\alpha$=0.7 crept up a little higher than those of the unpitched, $\alpha$=0.6 model, and became roughly equivalent to those for the uncoupled rotor. The probability of exceedence for a given maximum load also increases slightly for the pitched blade as shown in FIG. 2.10. Similarly, as shown in FIG. 2.11, the average power levels have crept down some and are also roughly equivalent to those for the uncoupled rotor. (This was expected since the two power curves are now roughly equivalent). However, referring to FIGS. 2.4 and 2.5 (*a, b,* and *c*), the fatigue damage levels for nearly all cases shown were still shown to be reduced by at least a factor of two when compared to those of the uncoupled rotor. Thus in this case the primary improvement provided by the inventive twist-coupled blade is a substantial reduction in fatigue damage.

Thus, the ADAMS software was employed to confirm the feasibility of using blades that twist as they bend to mitigate fluctuating loads. Time series calculations were made for three average hub-height wind speeds, two wind turbulence settings and five levels of twist-coupling. Fatigue damage was computed from the load histories using material exponents that represented materials ranging from welded steel to composites.

We determined that twist-coupling toward stall produces significant increases in fatigue damage, and for a range of wind speeds in the stall regime apparent stall flutter behavior is observed. For twist-coupling toward feather with a coupling coefficient of 0.6, however, fatigue damage is decreased by at least a factor of two for almost all of the cases investigated. The damage reductions seemed to be relatively independent of the material exponent.

Concurrent with lower fatigue damage estimates for positive twist-coupling, maximum loads decreased modestly and average power increased due to elevations in the power curve in the stall region. When the pitch was altered to bring the power curve into agreement with that of the uncoupled rotor, fatigue damage levels remained at the same reduced levels while differences in maximum load and average power are reduced.

The following example is of an inventive rotor blade which attenuates loading while also addressing the added problem of power regulation.

Example 2

The present invention includes improved bending twist-coupled blades in rotors that use different power-control strategies. In confirming these alternative embodiments, a constant speed type stall-controlled rotor was included in the simulation as a baseline. Two of the more commonly accepted control strategies, variable speed stall-control and variable speed pitch-control, were used. The blades of each of these alternative embodiment rotors were first optimized mized by setting the pretwist such that a desirable twist distribution is achieved at rated power. In each case this procedure produced power curves for the twist-coupled rotors that were nearly identical to those of the uncoupled rotors to which they were compared.

A separate study for the variable speed stall-controlled rotor was performed wherein the twist-coupled rotor efficiency was compared to that of the uncoupled one in a steady wind environment. The peak rotor efficiency was determined at each windspeed by optimally adjusting the rotor RPM. This peak efficiency was plotted versus wind speed and compared to that for blades with no twist-coupling.

For the three rotors, simulations were completed for turbulent winds to compare the associated fatigue damage reductions for the twist-coupled blades relative to the uncoupled ones. Power degradations were also determined.

Because twist-coupling tends to soften rotor blades, additional simulations were completed to assess the degree to which this softening alone reduces the fatigue damage. Thus, the variable speed stall-controlled rotor blades were softened to have the equivalent stiffness of the twist-coupled ones, but without the twist-coupling.

Using twist-coupled models of a representative rotor and three different control strategies, ADAMS was exercised using turbulent wind time series generated with NLWIND-3D for hub-height mean windspeeds of 8 m/s, 14 m/s and 20 m/s, each approximately 90 minutes in length. For the stall-controlled rotors, these windspeeds represented the linear aerodynamic, stall and deep stall regions of the power curve, respectively. Two turbulence levels were used in these simulations, the current IEC Class I standard and 50% of that standard. As mentioned, these respective levels represent a relatively turbulent site and a relatively benign site, respectively. With the wind loadings defined as above, computations were completed for blades with the optimal pretwist and a value of the bending-twist coupling coefficient of $\alpha$=0.6, where $\alpha$=0.0 corresponds to the uncoupled case. Load histories and power output were computed and stored for all of the above cases for subsequent post processing.

Fatigue damage estimates were computed for these load histories assuming that damage is proportional to the load cycle amplitude raised to a material exponent, b, namely:

$$D\ S^b$$

where S is the stress amplitude and D is fatigue damage.

Values for b of 3, 6, and 9 were used to represent a range of materials from welded steel to aluminum to composites. Results are also presented for a value of b=1, which represents the average cyclic load. The damage was assumed to be cumulative and therefore Miner's Rule again was invoked. Damage results for the selected level of bending-twist coupling were compared to the uncoupled case. Average power levels were also compared.

The rotor models created using ADAMS-WT employed fully flexible blades comprised of 20 elements each. All other model parts and interconnections were rigid. Parameters for the basic model are presented in Table 3. The rotor blade was based on an existing 15 m blade design, modified to include twist-coupling. Models were developed for coupling coefficients of $\alpha$=0.6 and $\alpha$=0.0. For the uncoupled case, the pretwist varies as indicated in FIG. 3.1 by the solid curve (the negative sign indicating twist toward feather). For the twist-coupled rotor the pretwist was set so that this twist distribution was achieved at rated power.

TABLE 3

Alternative Model Configuration Summary.

| Parameter | Value |
|---|---|
| Number of blades | 3 |
| Rotor configuration | upwind |
| Yaw configuration | fixed |
| Blade length | 14.9 m |
| Rotor hub radius | 1.5 m |
| Rotor precone angle | 0.0 deg |
| Rotor radius | 16.4 m |
| Rotor hub height | 50 m |
| Rotor tilt angle | 0.0 deg |
| Sling (dist from yaw axis to hub) | 4.0 m |
| Rotor rotational speed (variable) | 0–32 RPM |

This pretwist was determined by building a rotor with two blades in the same azimuthal location, one uncoupled and one with twist-coupling. Pointers in the ADAMS/Solver dataset were then modified so that aeroloads from AERODYN computed for the uncoupled blade were also applied to the coupled one (in lieu of the aeroloads AERODYN would normally compute for it). The blade twist distribution that occured due to the twist-coupling under this loading was then subtracted from the desired twist distribution providing the optimal pretwist. Thus, when the aeroelastic twists were included in the aeroload computations, the twist distribution at the rated power coincided with the desired one. The accuracy of this technique depends, however, on the linearity of the blade twist with the aeroloads in the range of interest.

For the rotor turning at 32 RPM, the windspeed at rated power was defined to be 13 m/s. This value was selected in part to bring the peak power of the twist-coupled rotor into compliance with the peak power of the uncoupled rotor. The optimal pretwist for the twist-coupled blade under the load associated with this windspeed is shown by the dashed curve in FIG. 3.1. To be more consistent with convention, this pretwist could be recast by shifting the distribution so that the pretwist is zero at the tip and then specifying a full blade pitch of 4.85 degrees toward stall.

The power curves for the coupled with optimal pretwist and uncoupled rotors operating at a constant speed of 32 RPM are shown in FIG. 3.2. The two power curves are essentially equivalent, with the uncoupled rotor generating slightly more power than the twist-coupled one at the extremes of the windspeed range. Variable speed operation was effected by applying a reactive torque to the rotor at the low speed shaft. For the linear aerodynamics range of the power curve, this torque was made proportional to the RPM squared with the coefficient selected to balance the torque produced by the wind loads, thereby allowing the rotor to operate at maximum efficiency. The coefficient for the torque equation in the linear range was computed using data from the peak of the $C_p$ curve for the uncoupled rotor. This coefficient was also used for the twist-coupled rotor although it may not be optimal.

For the variable speed stall-controlled rotor, a variable speed transitions to the constant speed at 32 RPM. The tip speed ratio at peak $C_p$, combined with this rotor speed, indicate that the corresponding wind speed for the onset of constant speed operation is approximately 8.6 m/s. Constant speed operation was accomplished by significantly increasing the reactive torque when the RPM exceeds the desired constant speed value. Power curves for the uncoupled rotor and the twist-coupled one are shown in FIG. 3.3, with the pretwist of FIG. 3.1 applied to the twist-coupled blades. (FIG. 3.3 suggests that the coefficient in the torque equation for variable speed operation is sub-optimal.)

For a variable speed pitch-controlled rotor, variable speed operation continues until peak power is achieved. This occurs at an RPM of approximately 43.5 RPM with a corresponding wind speed of 12 m/s. For higher wind speeds, the rotor speed is held at this value and power is also held constant through active full span pitch control. Power curves for the uncoupled rotor and the twist-coupled one are shown in FIG. 3.4, with the pretwist of FIG. 3.1 applied to the twist-coupled blades.

Simulated turbulence was created using SNLWIND-3D for 2 average wind speeds as disclosed earlier herein. Inputs to the program were chosen to duplicate conditions specified in the IEC standard. Shear velocity input was used to vary turbulence intensity. Nine 10-minute wind data sets, each with a different seed, were created at each wind speed for IEC turbulence intensity levels. Nine additional 10-minute turbulence files were created at each wind speed with the turbulence intensity set to 50% of IEC levels. Generally turbulence intensities for the simulated winds at 8, 14 and 20 m/s came out slightly less than the target values.

For an uncoupled variable speed stall-controlled rotor, the efficiency of the rotor in the linear aerodynamic range can be maximized by running at the tip speed ratio associated with the peak of the power coefficient curve. For the twist-coupled case, however, the location of the peak of the power coefficient curve changes modestly with rotor RPM due to the twisting of the blades. Thus the maximum rotor efficiency must be represented as a function of windspeed (or RPM), and the RPM versus windspeed schedule required to achieve maximum efficiency must be altered from that of the uncoupled rotor.

Using the ADAMS software for both the twist- coupled and uncoupled rotors, power curves were generated for rotor speeds from 12 to 36 RPM in intervals of 3 RPM for windspeeds varying from 4 to 20 m/s. The families of $C_p$ curves shown in FIG. 3.5 were developed from these power curves. For the uncoupled rotor, these curves are nearly coincident as expected, but for the twist-coupled rotor there is some degree of spread due to the induced blade twisting. Plots of the maximum efficiency versus windspeed shown in FIG. 3.6 were also developed from the power curves. These curves indicate that over a significant portion of the windspeed range associated with linear aerodynamics, the maximum rotor efficiencies are essentially identical. At lower windspeeds the uncoupled rotor operates at modestly higher efficiencies than the twist-coupled rotor.

The RPM versus windspeed schedules required to achieve these efficiencies are shown in FIG. 3.7. It is noted that the schedule for the uncoupled rotor is approximately linear with windspeed, representing a constant tip speed ratio. The $C_p$ curves of FIG. 3.7 indicate that those for the twist-coupled rotor tend to have sharper peaks than those for the uncoupled rotor. (This may make it more difficult for the twist-coupled rotor to achieve maximum efficiency in a turbulent wind environment, resulting in reduced energy capture.)

This disclosure includes normalized fatigue damage and average power for uncoupled and twist-coupled constant speed stall-controlled, variable speed stall-controlled, and variable speed pitch-controlled rotors driven by the various turbulent wind loadings. The fatigue damage is computed for the out-of-plane root bending moment only as the loads are generally highest for that moment at that location. Loads due to blade twist are not considered in the damage computation. FIG. 3.8 summarizes the fatigue damage results for the baseline constant speed stall-controlled rotor. For each turbulence intensity and wind speed the damage fraction which is the ratio of the damage incurred by the twist-coupled rotor and the uncoupled one is set forth.

Although not immediately apparent from the damage fractions, the magnitude of the damage reductions is markedly greater for the higher material exponents, as indicated by the "log(Total Damage)" bar chart of FIG. 3.8. Generally, the damage fractions run from 0.7 to 0.8, except for the higher exponents at the 8 m/s average wind speed where they are significantly lower. This is the result of the higher load ranges that occur when the rotor is operating in the linear aerodynamic range, providing a greater opportunity for damage reduction. The damage fractions are generally smaller for 100% turbulence when compared to 50% turbulence. The bars for the material exponent of 1 signify the average cyclic load fractions that occur for the twist-coupled rotor relative to the uncoupled one. They are approximately 0.9 at 8 m/s and near 0.8 for the higher wind speeds.

Fatigue damage results for the variable speed stall-controlled rotor shown in FIG. 3.9 are generally similar to those for the baseline constant speed rotor presented in FIG. 3.8. For the variable speed pitch-controlled rotor, the damage fractions shown in FIG. 3.10 were generally lower than those for the previous two cases. At the average wind speed of 8m/s, the results were similar to prior ones but for the higher wind speeds the damage fractions were substantially smaller. This is a consequence of the pitch-control, which keeps the rotor operating in the linear aerodynamic range regardless of wind speed. As for the 8 m/s windspeed, the higher load ranges that occured when the rotor operated in this range provided greater opportunity for damage reduction. Generally, but not always, the higher turbulence level produced smaller damage fractions.

In FIG. 3.11, power fractions, which are the ratio of the power produced by the twist-coupled rotor and the uncoupled one, are provided for the three control strategies. As indicated, differences in power output between the uncoupled and twist-coupled rotors are negligible for all three control strategies.

Mathematical expressions have previously been presented indicating that the introduction of off diagonal terms in the beam stiffness matrix to model twist-coupling causes the beam to become softer in bending, even though the terms representing the flexural rigidity are not altered. Lobitz, D. W. and Veers, P. S. (1998) "Aeroelastic Behavior of Twist-Coupled HAWT Blades," AIAA-98-0029, Proc. 1998 ASME Wind Energy Symposium held at $36^{th}$ AIAA Aerospace Sciences Meeting and Exhibition, Reno, Nev., Jan. 12–15, 1998; Ong, C. H. and Tsai, S. W. (1999) "Design, Manufacture and Testing of a Bend- Twist D-Spar," Proceedings of the 1999 ASME Wind Energy Symposium, Reno, Jan. 11–14, 1999. This softening was also apparent in the present simulations, where blade tip deflections for the twist-coupled rotor exceed those of the uncoupled one by approximately 50%, as shown in the histograms of FIG. 3.12 for the 14 m/s windspeed at 100% IEC turbulence intensity.

To determine the role this softening plays in the damage reduction, an additional uncoupled model was developed where both the blade flexural rigidity and torsional stiffness were reduced to be commensurate with those of the twist-coupled model. Variable speed, stall control was used to control the rotor. Resulting blade tip deflections for this model are equivalent to those of the twist-coupled rotor (see FIG. 3.12). Fatigue damage comparisons for this softer uncoupled model, relative to the previous uncoupled one, are shown in FIG. 3.13 using the damage fraction defined as the ratio of the damage incurred by the softer uncoupled rotor and that of the original uncoupled one. The bar charts for the 8 m/s windspeed show a damage reduction associated with the softer uncoupled model, although not as large as that of the twist-coupled rotor shown in FIG. 3.9. For 14 m/s windspeed where the rotor has entered the stall aerodynamic range, the damage for the softer uncoupled rotor actually increases relative to the stiffer one. Thus, softening the blades produces mixed results with regard to fatigue damage reduction, and at best provides only a fraction of the damage reduction produced when twist-coupling is incorporated.

We thus determined the feasibility of using inventive wind turbine blades that twist as they bend to mitigate fluctuating loads for a variable speed rotor. The twist coupling coefficient for the blades was set at $\alpha$=0.6 (twisting toward feather), and the blades were pretwisted toward stall to match the constant speed power curve for uncoupled blades. Power control was achieved using three different strategies. The first, used as a baseline, was just stall control with a constant speed rotor. In the second, variable speed was implemented by imposing a reactive torque on the low speed shaft proportional to the RPM squared with the coefficient specified, so that the rotor operates at peak efficiency in the linear aerodynamic range, and, at higher wind speeds, by limiting the maximum RPM to take advantage of the stall controlled nature of the rotor. The third strategy also employed variable speed, but pitch control was implemented at the higher wind speeds enabling the rotor to continue operating in the linear aerodynamic range.

Prior to running turbulent wind simulations, steady wind results were obtained showing that for variable speed stall-controlled operation the twist coupled rotor described above can be almost as efficient as the uncoupled one if a slightly altered RPM versus windspeed schedule is followed.

Accordingly, turbulent wind simulations were made for three average hub-height wind speeds and two wind turbulence settings. Fatigue damage was computed from the load histories using material exponents that represent materials ranging from welded steel to composites. In most cases, significant fatigue damage reductions of from 20% to 80% were exhibited by the twist-coupled rotor. For the constant speed and variable speed rotors that employed stall-control, significant damage reductions were observed at the higher material exponents for the 8 m/s average wind speed where the rotor operates primarily in the linear aerodynamic range. For the variable speed pitch-controlled rotor, significant reductions were observed at the higher wind speeds as well due to its ability to continue to operate in the linear aerodynamic range even at the higher windspeeds. In all cases power production for the twist-coupled rotor was equivalent to the uncoupled one. Thus, for the twist-coupled rotor, substantial fatigue damage reductions prevailed for the rotor in variable speed operation as in the case for constant speed, and with no loss in power output.

The preceding examples can be repeated with similar success by substituting the generically or specifically described reactants and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A passively adaptive horizontal axis wind-turbine blade comprising a top, a bottom, a tip and a principal axis, and said blade comprising a composite fiber surface skin in which a substantial majority of fibers in said skin are inclined at angles of between 15 and 30 degrees to said axis, the fibers on said top and said bottom inclined in the same direction, wherein upward flap deflection of said blade induces said blade to twist toward feather with a bend-twist coupling coefficient of between 0.0 and 0.6.

2. A wind turbine blade according to claim 1 wherein said blade comprises a pretwist of zero at said tip and full blade pitch of approximately 5 degrees toward stall.

3. At least two wind turbine blades according to claim 2 combined to comprise a wind turbine rotor, wherein said rotor is stall-controlled at constant speed.

4. At least two wind turbine blades according to claim 3 wherein each of said blades manifests a damage fraction relative to an uncoupled blade of less than 1.0.

5. At least two wind turbine blades according to claim 2 combined to comprise a wind turbine rotor, wherein said rotor is pitch-controlled at constant speed.

6. At least two wind turbine blades according to claim 5 wherein each of said blades manifests a damage fraction relative to an uncoupled blade of less than 1.0.

7. At least two wind turbine blades according to claim 2 combined to comprise a wind turbine rotor, wherein said rotor is stall-controlled at variable speed.

8. At least two wind turbine blades according to claim 7 wherein each of said blades manifests a damage fraction relative to an uncoupled blade of less than 1.0.

9. At least two wind turbine blades according to claim 2 combined to comprise a wind turbine rotor, wherein said rotor is pitch-controlled at variable speed.

10. At least two wind turbine blades according to claim 9 wherein each of said blades manifests a damage fraction relative to an uncoupled blade of less than 1.0.

* * * * *